United States Patent
Coombs

(10) Patent No.: US 11,778,156 B2
(45) Date of Patent: Oct. 3, 2023

(54) STEREO DEPTH ESTIMATION

(71) Applicant: Five AI Limited, Bristol (GB)

(72) Inventor: Alan Coombs, Haddenham (GB)

(73) Assignee: Five AI Limited, Cambridge (GB)

(*) Notice: Subject to any disclaimer, the term of this patent is extended or adjusted under 35 U.S.C. 154(b) by 211 days.

(21) Appl. No.: 17/232,448

(22) Filed: Apr. 16, 2021

(65) Prior Publication Data

US 2021/0329211 A1 Oct. 21, 2021

(30) Foreign Application Priority Data

Apr. 16, 2020 (GB) ...................................... 2005538

(51) Int. Cl.
  *H04N 13/128* (2018.01)
  *G06T 5/00* (2006.01)
  *H04N 13/00* (2018.01)

(52) U.S. Cl.
  CPC ........... *H04N 13/128* (2018.05); *G06T 5/002* (2013.01); *G06T 2207/10012* (2013.01); *H04N 2013/0081* (2013.01)

(58) Field of Classification Search
  CPC ......... H04N 13/128; H04N 2013/0081; H04N 13/122; H04N 13/239; G06T 5/002; G06T 2207/10012; G06T 7/97
  See application file for complete search history.

(56) References Cited

U.S. PATENT DOCUMENTS

| | | | | |
|---|---|---|---|---|
| 10,321,112 | B2* | 6/2019 | Aflalo | G06T 7/593 |
| 2005/0105610 | A1* | 5/2005 | Sung | G06T 7/97 |
| | | | | 348/42 |
| 2008/0037862 | A1* | 2/2008 | Jeon | G06V 10/24 |
| | | | | 382/154 |
| 2011/0091096 | A1* | 4/2011 | Morris | G06T 7/593 |
| | | | | 382/154 |
| 2014/0169474 | A1* | 6/2014 | Kang | H04N 19/105 |
| | | | | 375/240.16 |
| 2017/0223332 | A1* | 8/2017 | Guo | H04N 13/128 |

OTHER PUBLICATIONS

Banks et al., Quantitative evaluation of matching methods and validity measures for stereo vision. The International Journal of Robotics Research. Jul. 2001;20(7):512-32.

(Continued)

*Primary Examiner* — Bobbak Safaipour
*Assistant Examiner* — Benedict E Lee
(74) *Attorney, Agent, or Firm* — GREENBERG TRAURIG, LLP; Andrew J. Tibbetts

(57) ABSTRACT

An in-stream disparity processing system comprises a delay block having an input for receiving an input stream of disparity cost vectors, and configured to provide a delayed stream of disparity cost vectors at an output of the delay block, by delaying the input stream by a predetermined amount; and a processing block having a cost input connected to receive the delayed stream of disparity cost vectors and a smoothing input connected to receive the input stream of disparity cost vectors, and configured to apply cost smoothing to the delayed stream based on the input stream, so as to generate, at an output of the processing block, a stream of reverse pass disparity cost vectors.

20 Claims, 17 Drawing Sheets

Histograms of error vs. full dual-pass for varying W

(56) References Cited

OTHER PUBLICATIONS

Banz et al., Real-time stereo vision system using semi-global matching disparity estimation: Architecture and FPGA-implementation. 2010 International Conference on Embedded Computer Systems: Architectures, Modeling and Simulation (SAMOS). Jul. 19, 2010:93-101.
Besse et al., Pmbp: Patchmatch belief propagation for correspondence field estimation. International Journal of Computer Vision. Oct. 1, 2014;110(1):1-11.
Cavallari et al., On-the-fly adaptation of regression forests for online camera relocalisation. Proceedings of the IEEE conference on computer vision and pattern recognition. 2017:4457-4466.
Chen et al., Fast MRF optimization with application to depth reconstruction. Proceedings of the IEEE conference on computer vision and pattern recognition. 2014:1-8.
Cocorullo et al., An efficient hardware-oriented stereo matching algorithm. Microprocessors and Microsystems. Oct. 1, 2016;46:21-33.
De-Maeztu et al., Linear stereo matching. 2011 International Conference on Computer Vision. Nov. 6, 2011:1708-1715.
Drory et al., Semi-global matching: a principled derivation in terms of message passing. German Conference on Pattern Recognition. Sep. 2, 2014:1-12.
Gehrig et al., A real-time low-power stereo vision engine using semi-global matching. International Conference on Computer Vision Systems. Oct. 13, 2009:134-143.
Geiger et al., Are we ready for autonomous driving? The KITTI Vision Benchmark Suite. 2012 IEEE Conference on Computer Vision and Pattern Recognition. Jun. 16, 2012:1-8.
Georgoulas et al., A real-time fuzzy hardware structure for disparity map computation. Journal of Real-Time Image Processing. Dec. 2011;6(4):257-73.
Godard et al., Unsupervised monocular depth estimation with left-right consistency. Proceedings of the IEEE Conference on Computer Vision and Pattern Recognition. 2017:270-279.
Golodetz et al., Collaborative large-scale dense 3d reconstruction with online inter-agent pose optimisation. IEEE transactions on visualization and computer graphics. Oct. 15, 2018;24(11):2895-905.
Hernandez-Juarez et al., Embedded real-time stereo estimation via semi-global matching on the GPU. Procedia Computer Science. Jan. 1, 2016;80:143-53.
Hicks et al., A depth-based head-mounted visual display to aid navigation in partially sighted individuals. PloS one. Jul. 3, 2013;8(7):e67695.1-12.
Hirschmüller et al., Evaluation of stereo matching costs on images with radiometric differences. IEEE transactions on pattern analysis and machine intelligence. Sep. 5, 2008;31(9):1-17.
Hirschmüller, Semi-global matching-motivation, developments and applications. Photogrammetric Week 11. 2011:173-84.
Honegger et al., Real-time and low latency embedded computer vision hardware based on a combination of FPGA and mobile CPU. 2014 IEEE/RSJ International Conference on Intelligent Robots and Systems. Sep. 14, 2014:4930-4935.
Hosni et al., Secrets of adaptive support weight techniques for local stereo matching. Computer Vision and Image Understanding. Jun. 1, 2013;117(6):620-32.
Komodakis et al., Fast, approximately optimal solutions for single and dynamic MRFs. 2007 IEEE Conference on Computer Vision and Pattern Recognition. Jun. 17, 2007:1-8.
Kuzmin et al., End-to-end learning of cost-vol. aggregation for real-time dense stereo. 2017 IEEE 27th International Workshop on Machine Learning for Signal Processing (MLSP). Sep. 25, 2017:1-6.
Li et al., SoC and FPGA oriented high-quality stereo vision system. 2016 26th International Conference on Field Programmable Logic and Applications (FPL). 2016:1-4.
Liu et al., Learning depth from single monocular images using deep convolutional neural fields. IEEE transactions on pattern analysis and machine intelligence. Dec. 3, 2015;38(10):2024-39.
Mattoccia et al., A passive RGBD sensor for accurate and real-time depth sensing self-contained into an FPGA. Proceedings of the 9th International Conference on Distributed Smart Cameras. Sep. 8, 2015:146-151.
Menze et al., Joint 3d estimation of vehicles and scene flow. ISPRS annals of the photogrammetry, remote sensing and spatial information sciences. 2015;2:427-434.
Oleynikova et al., Reactive avoidance using embedded stereo vision for mav flight. 2015 IEEE International Conference on Robotics and Automation (ICRA). May 26, 2015:50-56.
Pérez-Patricio et al., An FPGA stereo matching unit based on fuzzy logic. Microprocessors and Microsystems. May 1, 2016;42:87-99.
Pérez-Patricio et al., FPGA implementation of an efficient similarity-based adaptive window algorithm for real-time stereo matching. Journal of Real-Time Image Processing. Apr. 2019;16(2):1-16.
Perri et al., Stereo vision architecture for heterogeneous systems-on-chip. Journal of Real-Time Image Processing. Apr. 2020;17(2):393-415.
Prisacariu et al., Infinitam v3: A framework for large-scale 3d reconstruction with loop closure. ArXiv preprint arXiv:1708.00783v1. Aug. 2, 2017:1-19.
Rehmann et al., Fast cost-volume filtering for visual correspondence and beyond. IEEE Transactions on Pattern Analysis and Machine Intelligence. Aug. 1, 2012;35(2):3017-3024.
Scharstein et al., A taxonomy and evaluation of dense two-frame stereo correspondence algorithms. International journal of computer vision (IJCV). Apr. 2002;47(1):1-59.
Scharstein et al., High-accuracy stereo depth maps using structured light. 2003 IEEE Computer Society Conference on Computer Vision and Pattern Recognition. Jun. 18, 2003;1:I-I. 8 pages.
Scharstein et al., High-resolution stereo datasets with subpixel-accurate ground truth. German conference on pattern recognition (GCPR). Sep. 2, 2014:1-12.
Schmid et al., Stereo vision and IMU based real-time ego-motion and depth image computation on a handheld device. 2013 IEEE International Conference on Robotics and Automation (ICRA). May 6, 2013:4671-4678.
Shan et al., Hardware acceleration for an accurate stereo vision system using mini-census adaptive support region. ACM Transactions on Embedded Computing Systems (TECS). Apr. 1, 2014;13(4s):1-24.
Shotton et al., Scene coordinate regression forests for camera relocalization in RGB-D images. Proceedings of the IEEE Conference on Computer Vision and Pattern Recognition (CVPR). 2013:2930-2937.
Sun et al., Stereo matching using belief propagation. IEEE Transactions on pattern analysis and machine intelligence. Jun. 20, 2003;25(7):787-800.
Tateno et al., Cnn-slam: Real-time dense monocular slam with learned depth prediction. Proceedings of the IEEE Conference on Computer Vision and Pattern Recognition (CVPR). 2017:6243-6252.
Ttofis et al., Towards accurate hardware stereo correspondence: A real-time FPGA implementation of a segmentation-based adaptive support weight algorithm. 2012 Design, Automation & Test in Europe Conference & Exhibition (DATE). Mar. 12, 2012:703-708.
Wang et al., Real-time high-quality stereo vision system in FPGA. IEEE Transactions on Circuits and Systems for Video Technology. Jan. 30, 2015;25(10):1696-708.
Werner et al., Hardware implementation of a full HD real-time disparity estimation algorithm. IEEE transactions on consumer electronics. Apr. 2, 2014;60(1):66-73.
Zabih et al., Non-parametric local transforms for computing visual correspondence. European conference on computer vision (ECCV). May 2, 1994:151-158.
Zhang et al., Real-time high-definition stereo matching on FPGA. Proceedings of the 19th ACM/SIGDA international symposium on Field programmable gate arrays. Feb. 27, 2011:55-64.
Zhang, Microsoft kinect sensor and its effect. IEEE multimedia. Apr. 27, 2012;19(2):4-10.

(56) References Cited

OTHER PUBLICATIONS

Facciolo et al., MGM: A significantly more global matching for stereo vision. BMVC 2015;12 pages.

Hirschmüller, Stereo Processing by Semiglobal Matching and Mutual Information. IEEE transactions on pattern analysis and machine intelligence. 2008;30(2):14 pages.

Rahnama et al., R3SGM: Real-time Raster-Respecting Semi-Global Matching for Power-Constrained Systems. arXiv preprint arXiv:1810.12988. Oct. 30, 2018:8 pages.

Rahnama et al., Real-time highly accurate dense depth on a power budget using an FPGA-CPU hybrid SoC. IEEE Transactions on Circuits and Systems II: Express Briefs. Apr. 3, 2019;66(5):773-7.

Rhemann et al., Fast cost-volume filtering for visual correspondence and beyond. IEEE Transactions on Pattern Analysis and Machine Intelligence. Aug. 1, 2012;35(2):3017-3024.

* cited by examiner

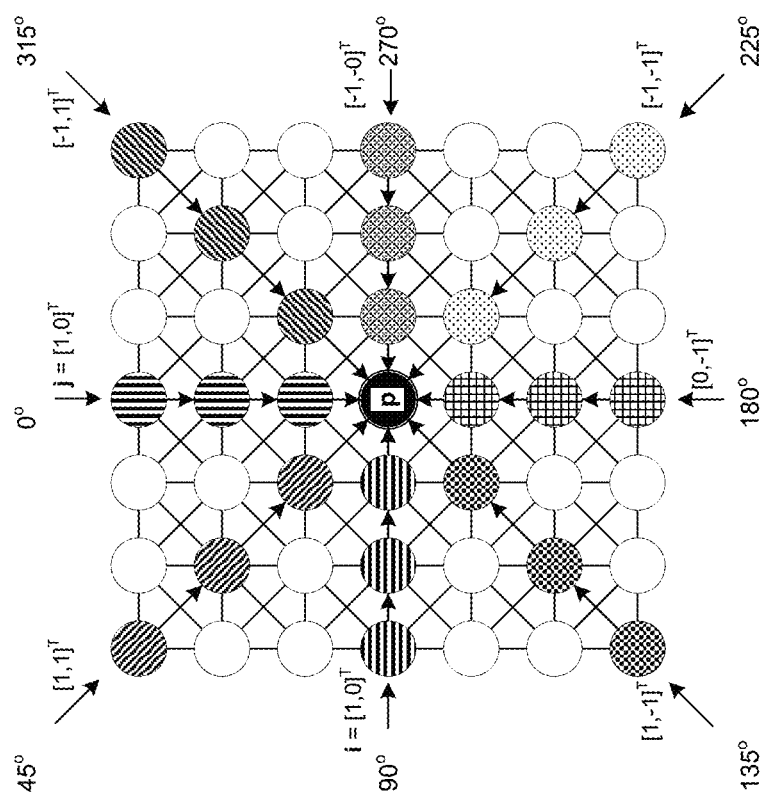
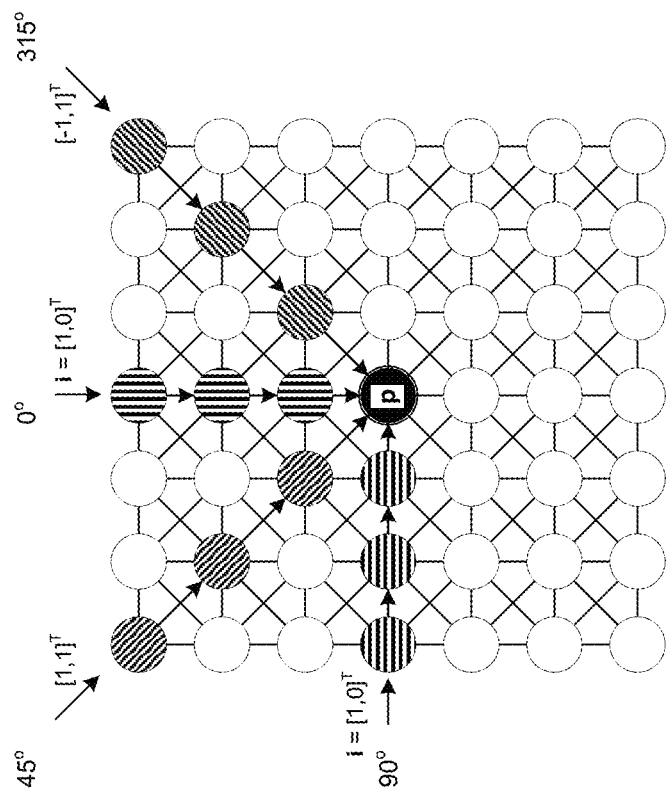
FIG. 3a
FIG. 3b

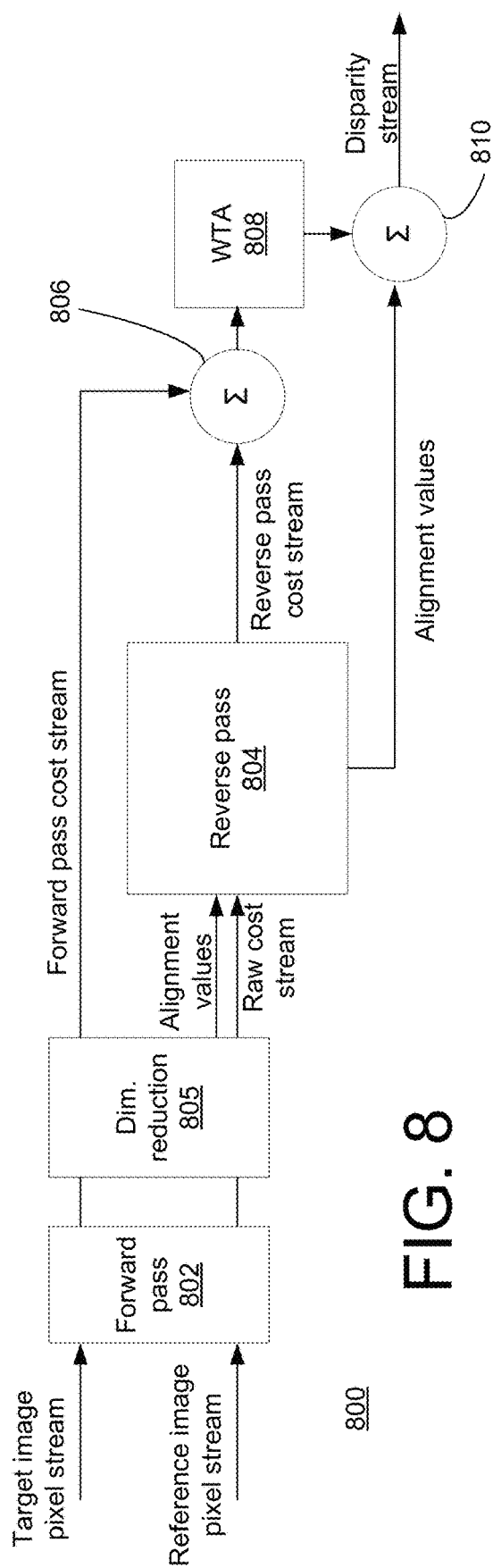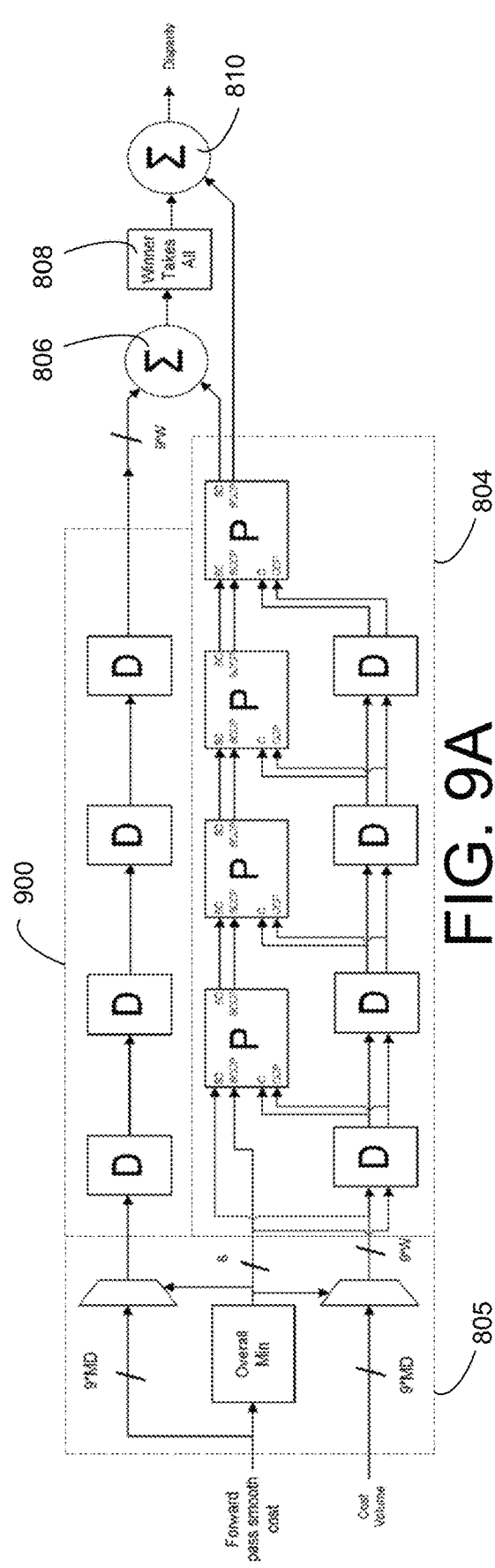

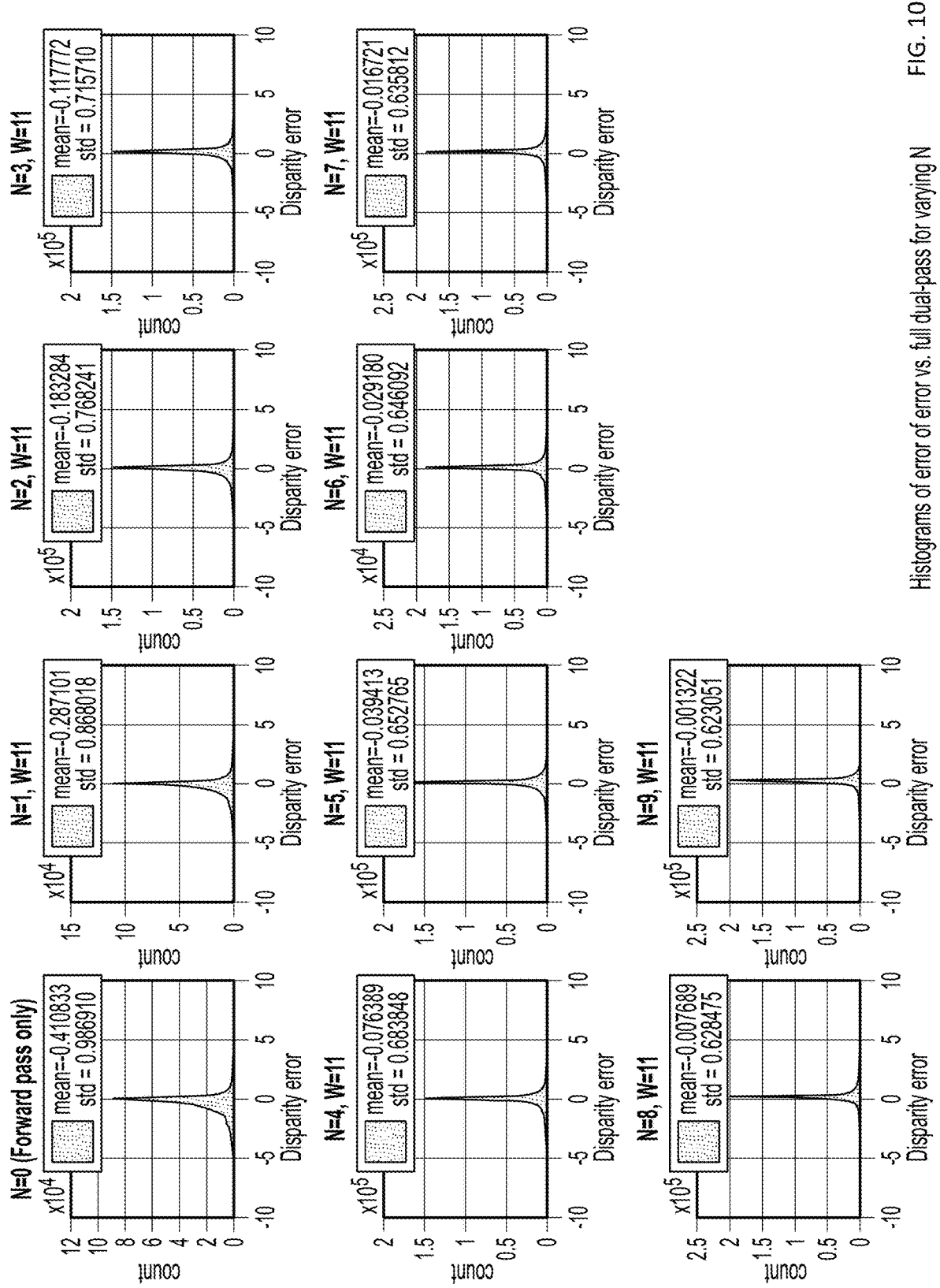
FIG. 10 Histograms of error of error vs. full dual-pass for varying N

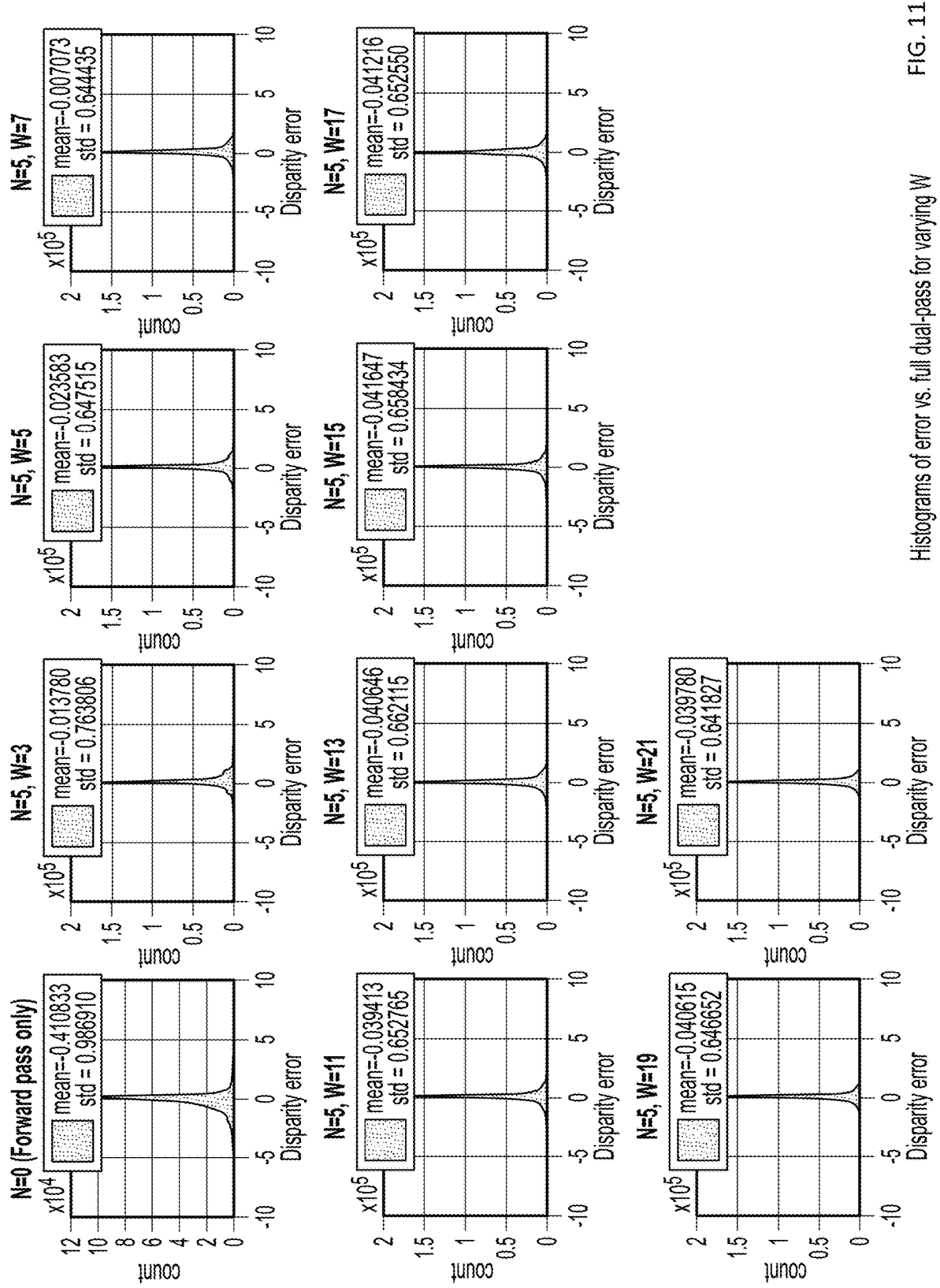
FIG. 11 Histograms of error vs. full dual-pass for varying W

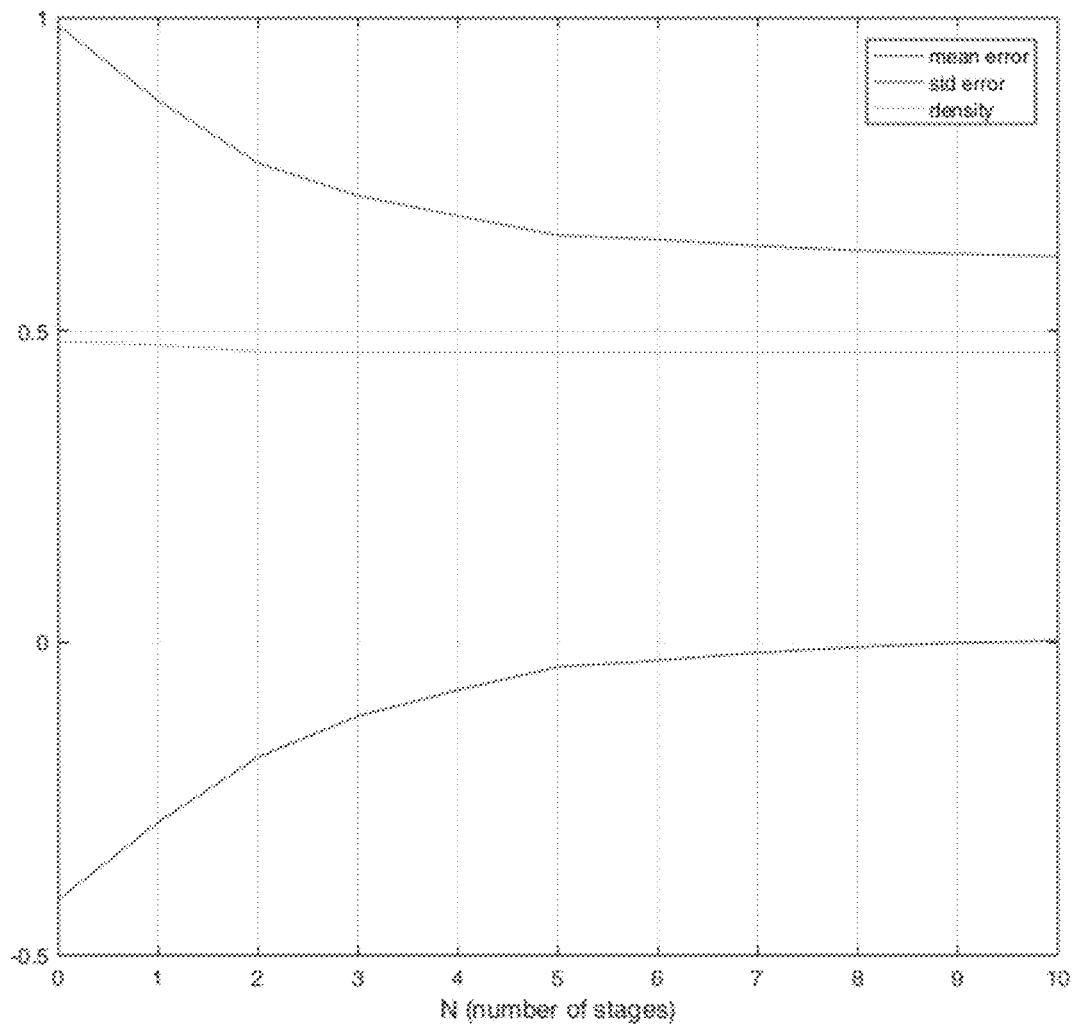
FIG. 12 : mean, standard deviation and density for increasing N

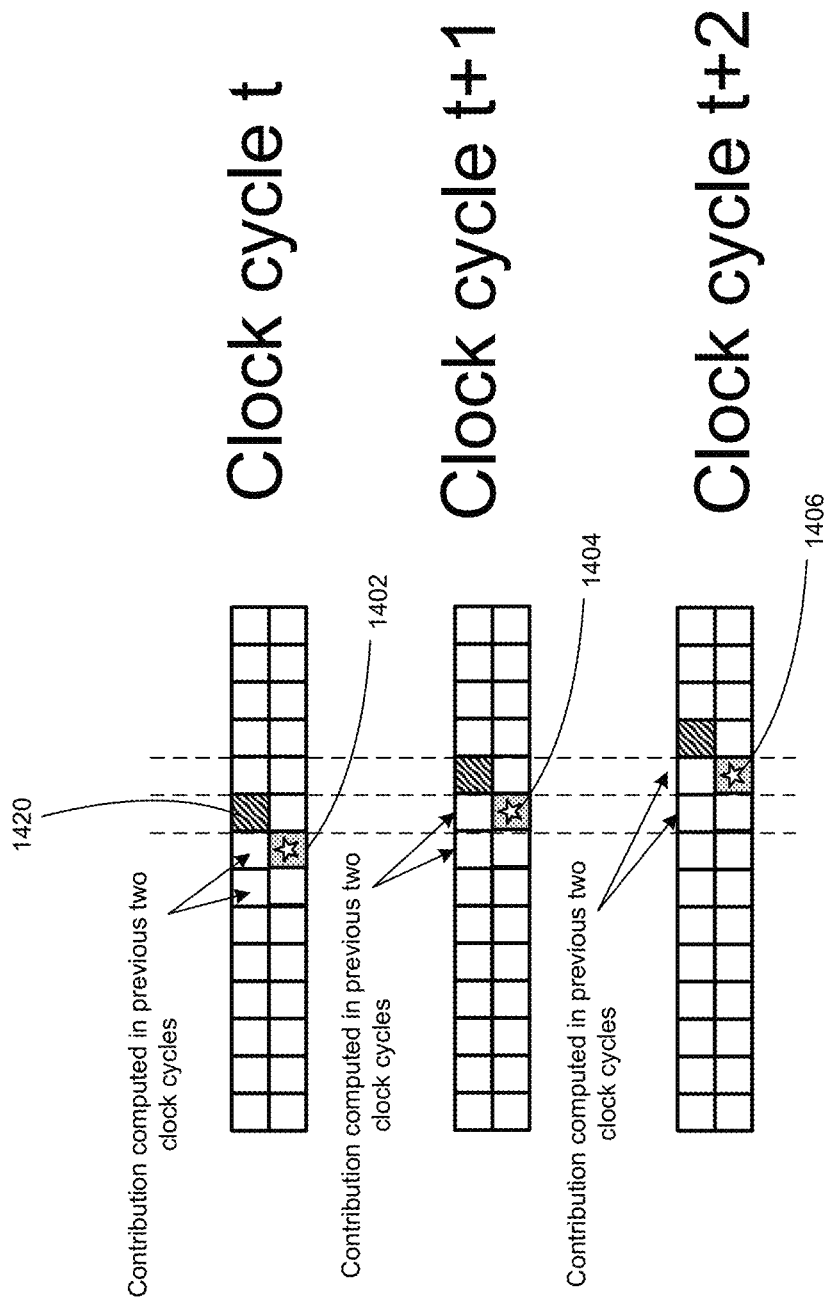

STEREO DEPTH ESTIMATION

RELATED APPLICATIONS

This application claims priority under 35 U.S.C. § 119 (a)-(d) to United Kingdom patent application number GB 2005538.0, filed Apr. 16, 2020, the entire contents of which are incorporated herein by reference.

TECHNICAL FIELD

This disclosure relates to stereo depth estimation, i.e. the extraction of depth information from a stereoscopic (stereo) image pair.

BACKGROUND

Numerous computer vision applications, including 3D voxel scene reconstruction, object recognition, 6D camera re-localisation, and autonomous navigation, either rely on, or can benefit from, the availability of depth to capture 3D scene structure.

For example, in the field of robotics, mobile robotic systems that can autonomously plan their paths in complex environments are becoming increasingly prevalent. An example of such a rapidly emerging technology is autonomous vehicles (AVs) that can navigate by themselves on urban roads. An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

Active approaches for acquiring depth, based on structured light or LiDAR, produce high-quality results. However, the former performs poorly outdoors, where sunlight washes out the infrared patterns it uses, whereas the latter is generally expensive and power-hungry, whilst simultaneously only producing sparse depth.

Significant attention has thus been devoted to passive methods of obtaining dense depth from either monocular or stereo images. Although recent approaches based on deep learning have made progress in the area, monocular approaches, which only require a single camera, struggle in determining scale. Stereo approaches, as a result, are often preferred when multiple cameras can be used, with binocular stereo methods (which achieve a compromise between quality and cost) proving particularly popular.

In an AV or other robotic system, stereo vision can be the mechanism (or one of the mechanisms) by which the robotic system observes its surroundings in 3D. In the context of autonomous vehicles, this allows a planner of the AV to make safe and appropriate driving decisions in a given driving context. The AV may be equipped with one or multiple stereo camera pairs for this purpose.

FIG. 1 shows a highly schematic block diagram of an example image processing system 106 (depth estimator), which is shown to have inputs to receive, from a stereo image capture system 102, via an image rectifier 104, a stereo pair of left and right images denoted L and R respectively. A disparity map D, as extracted from the stereo image pair L,R, is shown to be provided by the depth estimator 106 as an output. The disparity map D assigns, to each pixel (i,j) of a "target" image of the stereo image pair, an estimated "disparity" $D_{ij}$. Here, the index i denotes pixel row (with i increasing from left to right) and index j denotes pixel column (with j increasing from top to bottom) In the present example, the target image is chosen as the left image L, hence each pixel of the left image L is assigned an estimated depth. The other image—in this case, the right image R—is used as a reference image. However, in general, either image can be the target image, with the other image being used as the reference image.

Some of the principles which underpin stereo vision are briefly outlined with reference to FIG. 2. The top part of FIG. 2 shows schematic views of the stereo image capture system 102, in which the z-axis of a Cartesian coordinate system is defined as lying parallel to the optical axis of the camera which captures the target image (the left camera 102L in the present example). The left-hand side shows a plan view (in the x-z plane) of left and right optical sensors (cameras) 102L, 102R, which are shown to be horizontally separated (i.e., in the x direction) from each other by a distance b (the baseline). The right-hand side shows a side-on view (in the x-y plane) in which only the left camera 102L is visible due to the fact that the cameras 102L, 102R are substantially aligned in the vertical (y) direction. It is noted that, in the present context, the terms vertical and horizontal are defined in the frame of reference of the stereo image capture system, i.e. vertical means the direction in which the cameras 102L, 102R are aligned and left and right refer to the two directions along the x-axis as defined above (irrespective of the direction of gravity).

By way of example, pixel (i,j) in the left image L and pixel (i',j) in the right image R are shown to correspond to each other in that they each correspond to substantially the same real-world scene point P. Reference numeral 200 denotes the image plane of the captured images L, R in which the image pixels are considered to lie. Due to the horizontal offset between the cameras 102L, 102R, those pixels in the left and right images exhibit a relative "disparity", as illustrated in the lower part of FIG. 2. The lower part of FIG. 2 shows a schematic representation of rectified left and right images L, R as captured by the cameras 102L, 102R and the disparity map D extracted from those images. The disparity associated with pixel (i,j) in the target image L means the offset between that pixel and the corresponding pixel (i',j) in the reference image R, which is caused by the separation of the cameras 102L, 102R and depends on the depth (distance from the camera 102L along the z axis) of the corresponding scene point P in the real-world.

Thus, pixel depth can be estimated by searching for matching pixels between the left and right images L,R of a stereo image pair and measuring the disparity between them. The search for matching pixels can be simplified by an inherent geometric constraint, namely that, given a pixel in the target image L, any corresponding pixel in the reference image R will be appear in the reference image on a known "epipolar line". For an ideal stereoscopic system with vertically-aligned image capture units, the epipolar lines are all horizontal such that, given any pixel (i,j) in the target image L, the corresponding pixel (assuming it exists) will be vertically aligned i.e. located in the reference image R in the same pixel row (j) as the pixel (i,j) in the target image L. This may not be the case in practice because perfect alignment of the stereo cameras is unlikely. However, image rectification is applied to the images L,R, by the image rectifier 104, to account for any misalignment and thereby ensure that corresponding pixels are always vertically aligned in the images. Hence, in FIG. 1, the depth estimator 106 is shown to receive, from the image rectifier 104, rectified versions of the left and right images L,R from which the disparity map D may be extracted.

In the present example, it is assumed that, in the pixel-matching search, pixel (i,j) in the target image L is correctly found to match pixel (i',j) in the reference image R. Hence, the disparity assigned to pixel (i,j) in the target image L is $$D(p)=D_{ij}=i-i',$$

where pixel (i,j) is denoted in mathematical notation as $p=[i,j]^T$. In this manner, a disparity is assigned to each pixel of the target image for which a matching pixel can be found in the reference image (this will not necessarily be all of the pixels in the target image L: there may for example exist a region of pixels at one edge of the target image which are outside of the field of view of the other camera and thus have no corresponding pixels in the reference image; the search may also fail to find a match e.g. because the corresponding scene point is occluded in the reference image, or depth values may be pruned if they do not meet certain criteria. Repeating patterns or textureless regions in the images may also cause false matches.).

The depth of each such target image pixel is thus computed initially in disparity space. Each disparity can, in turn, be converted, as needed, into units of distance using knowledge of the camera intrinsics (focal length f and baseline b) as:

$$d_{ij} = \frac{bf}{D_{ij}}$$

where $d_{ij}$ is the estimated depth of pixel (i,j) in the target image L in units of distance, i.e. the distance between the camera 102L which captured the target image L and the corresponding real-world point P along the optical axis of the stereo camera system 102 (z-axis).

Many binocular stereo methods find correspondences between two such images and use them to estimate disparity. This is typically split into four sequential phases: (a) matching cost computation, (b) cost aggregation, (c) disparity optimisation, and (d) disparity refinement. At a high level, such methods can be classified into two categories, based on the subset of steps mentioned above that they focus on performing effectively, and the amount of information used to estimate the disparity for each pixel:

1. Local methods focus on steps (a) and (b), finding correspondences between pixels in the left and right images by matching simple, window-based features across the disparity range. Whilst fast and computationally cheap, they suffer in textureless/repetitive areas, and can easily estimate incorrect disparities.

2. Global methods, by contrast, are better suited to estimating accurate depths in such areas, since they enforce smoothness over disparities via the (possibly approximate) minimisation of an energy function defined over the whole image (they focus on steps (c) and (d)). However, this increased accuracy tends to come at a high computational cost, making these methods unsuitable for real-time applications.

So-called "Semi-global matching" (SGM) bridges the gap between local and global methods: by approximating the global methods' image-wide smoothness constraint with the sum of several directional minimisations over the disparity range (usually 8 or 16 directions, in a star-shaped pattern), it produces reasonable depth in a fraction of the time taken by global methods. SGM has thus proved highly popular in real-world systems.

Further details of SGM may be found in H. Hirschmuller. Stereo Processing by Semi-Global Matching and Mutual Information, T-PAMI, 30(2):328-341, 2008, which is incorporated herein by reference in its entirety.

However, SGM have various drawbacks. Because the disparities that SGM computes for neighbouring pixels are based on star-shaped sets of input pixels that are mostly disjoint, SGM suffers from "streaking" in areas in which the data terms in some directions are weak, whilst those in other directions are strong. This streaking effect can result in a significant loss of accuracy in the disparity map when applied to certain types of image. Recently, this problem has been partially addressed by an approach called More Global Matching (MGM), which incorporates information from two directions into each of SGM's directional minimisations.

Further details of MGM may be found in G. Facciolo, C. de Franchis, and E. Meinhardt. MGM: A Significantly More Global Matching for Stereovision, in BMVC, 2015, which is incorporated herein by reference in its entirety.

Whilst MGM is generally effective in overcoming some of the underlying issues with SGM, MGM cannot be applied straightforwardly in an embedded context. This is because it requires multiple passes over the pixels in the input images, several of them in non-raster order, to compute bi-directional energies to be minimised.

A form of stereo depth estimation known as "R3SGM" addressees certain issues with MGM. Further details of R3SGM may be found in Rahnama et. al. "R3SGM: Real-Time Raster-Respecting Semi-Global Matching for Power-Constrained Systems" (2018 International Conference on Field-Programmable Technology (FPT)).

R3SGM expands on and leverages some of the key ideas introduced in MGM to provide a method that attains competitive levels of accuracy but which, in contrast to MGM, is much more amenable to a real-time FPGA (Field Programmable Gate Array) or other embedded implementations. In a practical context, this translates to a similar level of accuracy but achieved with greater speed and much lower power consumption. When implemented on a raster-like, in-stream processing platform (referred to herein as an "embedded" platform for conciseness), such as an FPGA, there are particular benefits of R3SGM in terms of both increased speed and improved memory efficiency.

SUMMARY

MGM and R3SGM both use a cost-based approach, in which disparity costs from neighbouring pixels are accumulated across the image. The reason MGM is not conducive to an embedded implementation is that it requires multiple passes over each image in non-raster order in order to compute an overall disparity cost. This means each image of a stereo pair has to be buffered in full whilst the disparity map is computed. R3SGM addresses this issue by re-formulating the disparity costs in a manner that only requires costs to be accumulated from pixels that have already been received when the image is streamed in raster order. This means that pixelwise costs can be computed for individual pixels as the image is streamed, without having to buffer the whole image. One implementation of R3SGM referred to as "Full R3SGM" accumulates costs in four directions; East, South East, South, and South West when image is streamed in raster order from left to right. The disparity costs are defined so that only the costs associated with a current pixel's immediate neighbours (the pixel to its immediate left and the three pixels immediately above it) need to be considered. Another implementation, referred to herein as Fast R3SGM, drops the East direction, and considers only the three pixels immediately above the current pixel, which has been found to further improve the efficiency of embedded implementations of the algorithm.

The efficiency benefits of R3SGM and Fast R3SGM are highly significant, particularly when processing large volumes of data (e.g. processing high-resolution images captured at a rate of 10s or 100s of frames per second). The way that the cost functions are defined also means that, although only immediately neighbouring pixels are considered when computing pixelwise disparity costs, those costs are highly effective at incorporating information across the portion of the image that has been received at that point, i.e. the entire subset of pixels that have already been streamed in raster order up to the current pixel for Full R3SGM, and all of the pixels that have been received up to the top-most neighbouring pixels of the current pixel in the case of Fast R3SGM. However, pixels after the current pixel in raster order in the case of Full R3SGM and pixels after the current pixel's top-most neighbours in Fast R3SGM are not considered when computing a disparity cost of the current pixel. This can lead to a directional bias effect, where pixels towards the top of the image have a greater effect on disparity smoothing. This is particularly apparent when the measured disparities are not uniformly distributed across the image—e.g. in many real-world images, including road images captured from a travelling vehicle (for example), structure towards the bottom of the image will generally be closer to the camera than structure at the top of the image.

One solution to this issue of directional bias is set out in Rahnama et. al., "Real-Time Highly Accurate Dense Depth on a Power Budget using an FPGA-CPU Hybrid SoC" (IEEE Transactions on Circuits and Systems II (TCAS-II): Express Briefs, 2019)—the "Hybrid Architecture". This performs two R3SGM passes over each stereo image pair, where one of those passes flips the images vertically or rotates them 180 degrees. Each pass produces a disparity map but one exhibits directional bias from the top of the image and the other from the bottom of the (original) image. A consistency check is then performed on the disparity maps computed in the two passes, to remove inconsistent disparities. The directional bias effects in the two images would effectively cancel each other out in the consistency check. This is a viable solution, but has the effect of reducing the density of the disparity image. This is not an issue in that context, because the aim of that system is to initially produce a sparse but accurate "prior" as an input to a second dense disparity map computation stage. Another consequence of this consistency check is that whole images need to be buffered, because two disparity maps need to be computed in full before the consistency check can be performed. This is addressed in the aforementioned reference through the use of a hybrid CPU-FPGA architecture, where operations not conducive to embedded implementation are implemented on the CPU.

Herein, a different solution is provided to the issue of directional bias in R3SGM and variants thereof. The present solution has the benefit that it can be entirely and implemented efficiently in an embedded platform, such as an FPGA, and does not require the use of a CPU for efficient implementation.

A first aspect herein provides an in-stream disparity processing system comprising: a delay block having an input for receiving an input stream of disparity cost vectors, and configured to provide a delayed stream of disparity cost vectors at an output of the delay block, by delaying the input stream by a predetermined amount; and a processing block having a cost input connected to receive the delayed stream of disparity cost vectors and a smoothing input connected to receive the input stream of disparity cost vectors, and configured to apply cost smoothing to the delayed stream based on the input stream, so as to generate, at an output of the processing block, a stream of reverse pass disparity cost vectors.

Cost smoothing is applied to the delayed stream, based on the input stream, therefore the delayed stream is "behind" the input stream by said predetermined amount. For a current pixel, cost smoothing is applied to that pixel's disparity cost vector in the delayed input stream, and can therefore take into account contributions form one or more subsequent neighbouring pixels from the input stream. This may be referred to herein as "reverse pass" cost smoothing, where the contribution from subsequent pixels in the stream is taken into effect, in contrast with "forward pass" cost smoothing where only the contribution from previous neighbouring pixels in the stream is taken into effect.

In MGM or R3SGM, the contribution from neighbouring pixels would normally come from those pixels' smoothed disparity cost vectors—R3SGM is form of forward pass cost smoothing where, by design, the smoothing contribution comes exclusively from previous pixels. However, with reverse pass cost smoothing, the smoothed disparity cost vectors for the subsequent neighbouring pixels have not yet been computed. This issue is addressed by approximating the neighbouring pixels' smoothed cost vectors as their unsmoothed cost vectors in the input stream itself.

In embodiments, this is only an initial coarse estimate of the reverse pass cost vector for each pixel, and the estimate is refined in subsequent processing block(s). In each subsequent processing block, the contribution from the subsequent neighbouring pixels is estimated based on their reverse pass cost estimates from the previous processing block.

In such embodiments, the delay block may be the first in a series of delay blocks, each other delay block having an output and an input connected to the output of the previous delay block, and may be configured to provide at its output a delayed stream of disparity cost vectors by further delaying, by a predetermined amount, the delayed stream of disparity cost vectors received from the previous delay block. The processing block may be the first in a series of processing blocks, each other processing block having an output, a cost input connected to the output of a corresponding one of the delay blocks and a smoothing input connected to the output of the previous processing block, and may be configured to generate, at its output, a stream of reverse pass disparity cost vectors, by applying cost smoothing to the delayed stream received from the corresponding delay block, based on the stream of reverse pass disparity cost vectors generated at the output of the previous processing block.

The processing system of claim 1, wherein each disparity cost vector of the input stream has an associated alignment value, that remains associated with it in the delayed stream, wherein the processing block is configured to account for any offset between each disparity cost vector of the input stream and one or more disparity cost vectors of the delayed stream used to smooth it, using the alignment values associated with those pixels.

The processing system may comprise a reduction component configured to reduce the dimensions of each disparity cost vector of the input stream, before it is provided to the delay block and the processing block, the alignment value indicating which of the dimensions has been retained.

Each processing block of the above series of processing blocks may be configured to output, with each of its reverse pass disparity cost vectors, the alignment value of the corresponding disparity cost vector of the delayed stream received at its cost input, each other processing block configured to use the alignment values received from the previous processing block to account for any offsets with the delayed stream received from its corresponding delay block.

The processing system may comprise an input configured to receive a stream of forward pass disparity cost vectors and a cost aggregation component configured to combine each reverse pass disparity cost outputted by the (final) processing block with a corresponding one of the forward pass disparity cost vectors.

The processing system may comprise a disparity estimation component configured to determine a pixel disparity for each combined disparity cost vector based on a lowest cost dimension of the combined disparity cost vector.

The reduction component may be configured to: determine a lowest cost dimension of each forward pass disparity cost vector, and reduce the dimensions of each disparity cost vector based on the lowest cost dimension of a corresponding one of the forward pass disparity cost vectors, that lowest cost dimension being the alignment value of that disparity cost vector.

The pixel disparity may be determined as the sum of the minimum cost dimension of the combined disparity cost vector with the alignment value.

The processing system may comprise an image processing component configured to receive a target image stream and a reference image stream, and use the reference image stream to compute, for each pixel of the target image stream, a disparity cost vector of the input stream.

The image processing component may be configured to compute, for each pixel of the target image stream, one of the above forward pass disparity cost vectors, based on: (i) the disparity cost vector of that pixel, and (ii) the forward pass disparity cost vector of at least one preceding pixel in the target image stream but not any subsequent pixel of the target image stream, such that the forward pass disparity cost vectors exhibit directional bias caused by the order in which pixels of the target image stream are received and processed, the reverse pass disparity cost vectors for compensating for said directional bias.

The (or each) delay block may be configured to delay its received stream by one pixel row.

The (or each) processing block may compute a smoothing contribution for each disparity cost vector received at its smoothing input, which is stored at that processing block and used to apply cost smoothing to multiple disparity cost vectors received at its cost input.

The alignment value of the disparity cost vector received at the smoothing input may remain associated with its smoothing contribution for applying the cost smoothing to the multiple disparity cost vectors received at its cost input.

A second aspect herein provides a method of smoothing an input stream of disparity cost vectors, the method comprising, in an in-stream processing system: receiving at a processing block of the in-steam processing system (i) an input stream of disparity cost vectors, and (ii) a version of the input stream delayed by a predetermined amount, the disparity cost vectors associated with respective pixels of a target image stream, having been determined by applying stereo image processing to the target image stream and a reference image stream; and for each of the pixels, applying cost smoothing to that pixel's disparity cost vector, as received in the delayed stream, based on the disparity cost vector(s) of one or more neighbouring pixels, as received in the input stream, the neighbouring pixels being subsequent to that pixel in the target image stream, which is accounted for by said delaying of the input stream.

The method may comprise receiving at a second processing block of the in-stream processing system (i) a first reverse pass cost stream, from the first processing block, and (ii) a second delayed version of the input stream obtained by further delaying the input stream, wherein the first reverse pass cost stream contains, for each of said pixels, a first reverse pass cost vector as computed at the first processing block from said cost smoothing; and for each of the pixels, applying second cost smoothing to that pixel's disparity cost vector, as received in the second delayed stream, based on the first reverse pass cost vector(s) of one or more neighbouring pixels, as received in the first reverse pass cost stream, thereby computing a second reverse pass cost vector for that pixel, the second reverse pass cost vectors outputted from the second processing block as a second reverse pass cost stream.

Said processing block n=0 may be a first processing block in a processing chain with one or more subsequent processing blocks n>0 and the method may comprise, at each subsequent processing block n>0: receiving an nth delayed version of the input stream, and computing, for each of said pixels p, a reverse pass cost vector $R_p^{n+1}$, by applying cost smoothing to that pixel's disparity cost vector $C_p$ in the nth delayed input stream, based on $R_{p-x}^n$ for at least one subsequent neighbouring pixel p-x, where $R_{p-x}^n$ is the reverse pass cost vector assigned to the neighbouring pixel p-x in the previous processing block n-1

The method may comprise the step of assigning a disparity value to each of the pixels based on one of: that pixel's reverse pass cost vector, that pixel's second reverse pass cost vector, or that pixel's $R_p^N$ reverse pass cost vector where processing block N-1 is the final processing block in the processing chain.

The method may comprise the step of assigning, to each of the pixels, a combined cost vector by combining (i) said one reverse pass cost vector with (ii) a forward pass cost vector computed for that pixel based on a forward pass cost vector of at least one preceding pixel but not any subsequent pixel, thereby compensating for a directional bias in the forward pass cost vectors, the disparity value assigned to each pixel based on its combined cost vector.

A further aspect herein provide a computer-readable storage medium having stored thereon circuit description code for configuring a field programmable gate array to implement the processing system or method, and The circuit description code may be register-transfer level (RTL) code.

A further aspect provides an autonomous vehicle comprising the processing system.

The in-stream processing system can, for example, take the form of a FPGA, Application Specific Integrated Circuit (ASIC) or other embedded device.

BRIEF DESCRIPTION OF FIGURES

For a better understanding of the present subject matter, and to show how embodiments of the same may be carried into effect, reference is made to the following figures in which:

FIG. 3a-d shows an array of pixels annotated to illustrate the principles of SGM (FIG. 3a), one possible FPGA implementation of SGM (FIG. 3b), MGM, (FIG. 3c) and what is referred to herein as $R^3SGM$ (FIG. 3d);

FIG. 8 shows a schematic block diagram of an in-stream image processing system incorporating forward and reverse pass disparity smoothing stages;

FIGS. 10 through 12 show comparative results obtained via a simulated implementation of the described system, with the Hybrid Architecture set out above used as an error baseline;

FIG. 14 illustrates how neighbour contributions may be computed efficiently in R3SGM.

DETAILED DESCRIPTION

Figure 1:
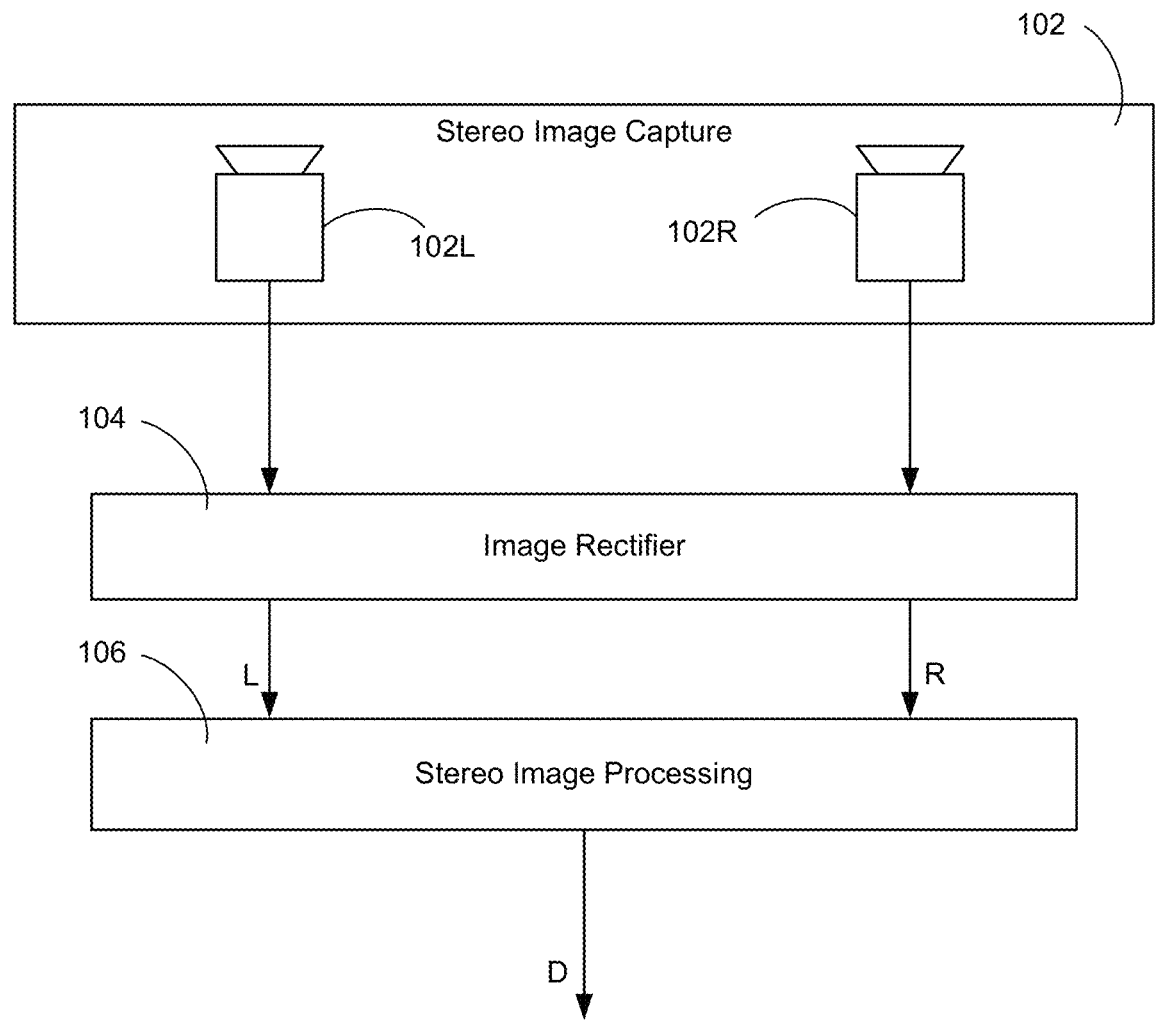
FIG. 1 shows a schematic block diagram of an image processing system.

Summarize the above, stereo depth may be calculated from a pair of rectified camera images using SGM. This may be enhanced for efficient hardware implementation to only process SGM neighbours from a single direction, processed in the raster order (as in R3SGM). It can be seen that this results in efficient, dense stereo depth. Ordinarily, SGM neighbour contributions from the reverse directions would be processed and accumulated in a resulting smoothed cost volume, resulting in an accurate disparity map.

Forward and reverse passes individually have an inherent, opposite bias on the disparity values due to the algorithm's tracking of local minima in the cost volume across rows. By accumulating the passes in both forward and reverse directions, this inherent bias is cancelled. However, when processed in real-time for high-resolution images, the size of the smoothed cost volumes and memory bandwidth limitations make implementation of SGM processing in reverse order infeasible.

The described embodiments provide a method of calculating unbiased stereo depth with a single raster pass, using information from reverse-direction SGM neighbour directions that may be efficiently implemented in hardware. The described method may be referred to herein as "Unbiased R3SGM". First, R3SGM in its original form is described to provide relevant context to the described embodiments.

1. Overview

Although many popular methods of stereo depth estimation strive solely for depth quality, for real-time mobile applications (e.g. prosthetic glasses or micro-UAVs or any other mobile robotic system where power is limited), speed and power efficiency are equally, if not more, important. Many real-world systems rely on Semi-Global Matching (SGM) to achieve a good balance between accuracy and speed, but power efficiency is difficult to achieve with conventional hardware, making the use of embedded devices such as FPGAs attractive for low-power applications.

As indicated, the full SGM algorithm is ill-suited to deployment on FPGAs, and so most FPGA variants of it are partial, at the expense of accuracy.

Moreover, as indicated, in a non-FPGA context, the accuracy of SGM has been improved by More Global Matching (MGM), which also helps tackle the streaking artifacts that afflict SGM.

The described embodiments of the invention provide a novel, resource-efficient method that builds on MGM's techniques for improving depth quality to provide an improved depth extraction algorithm that retains the benefits of MGM but which may be run in real time on a low-power FPGA. Through evaluation on multiple datasets (KITTI and Middlebury), it is demonstrated that, in comparison to other real-time capable stereo approaches, the described algorithm can achieve a state-of-the-art balance between accuracy, power efficiency and speed, making this approach particularly desirable for use in real-time systems with limited power.

First, there follows a more in-depth description of certain aspects of SGM and MGM which provide relevant context to the described embodiments.

Figure 2:
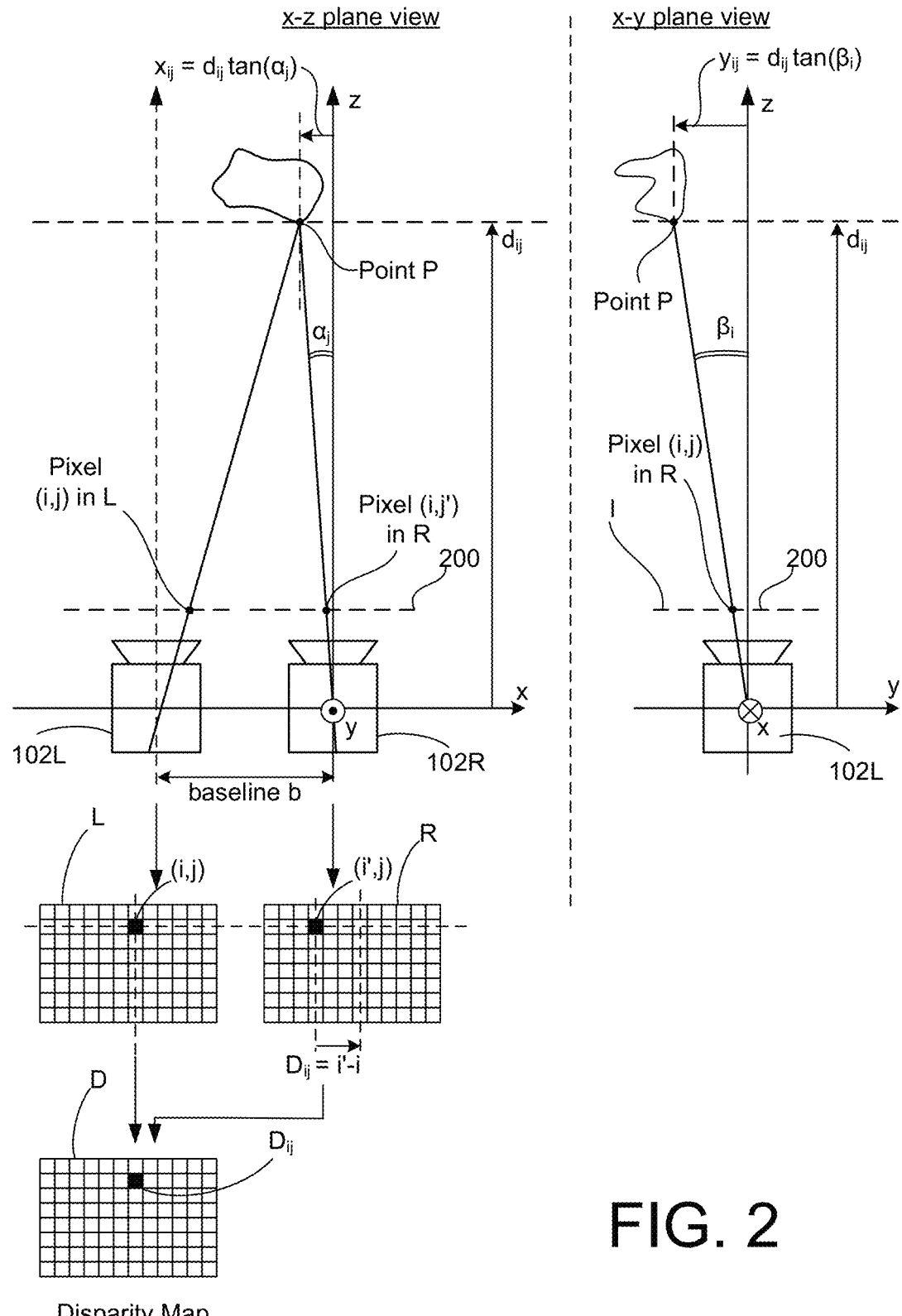
FIG. 2 shows a schematic illustration of certain principles underpinning stereo vision.

The general context of FIGS. 1 and 2, as set out above, is used as a reference throughout the following description.

By way of comparison, FIGS. 3A and 3B shows the pixels used to compute a cost vector $L_r(p, \bullet)$ for pixel p (in black) and each scan line r of a set of scan lines R, for a full implementation of SGM (FIG. 3A—see Section 2.1, below) and a typical raster-based FPGA implementation of SGM (FIG. 3B—see Section 2.1.1, below). Each distinct shading denotes a distinct scan line direction as set out in Table 1 below.

Figure 3C:
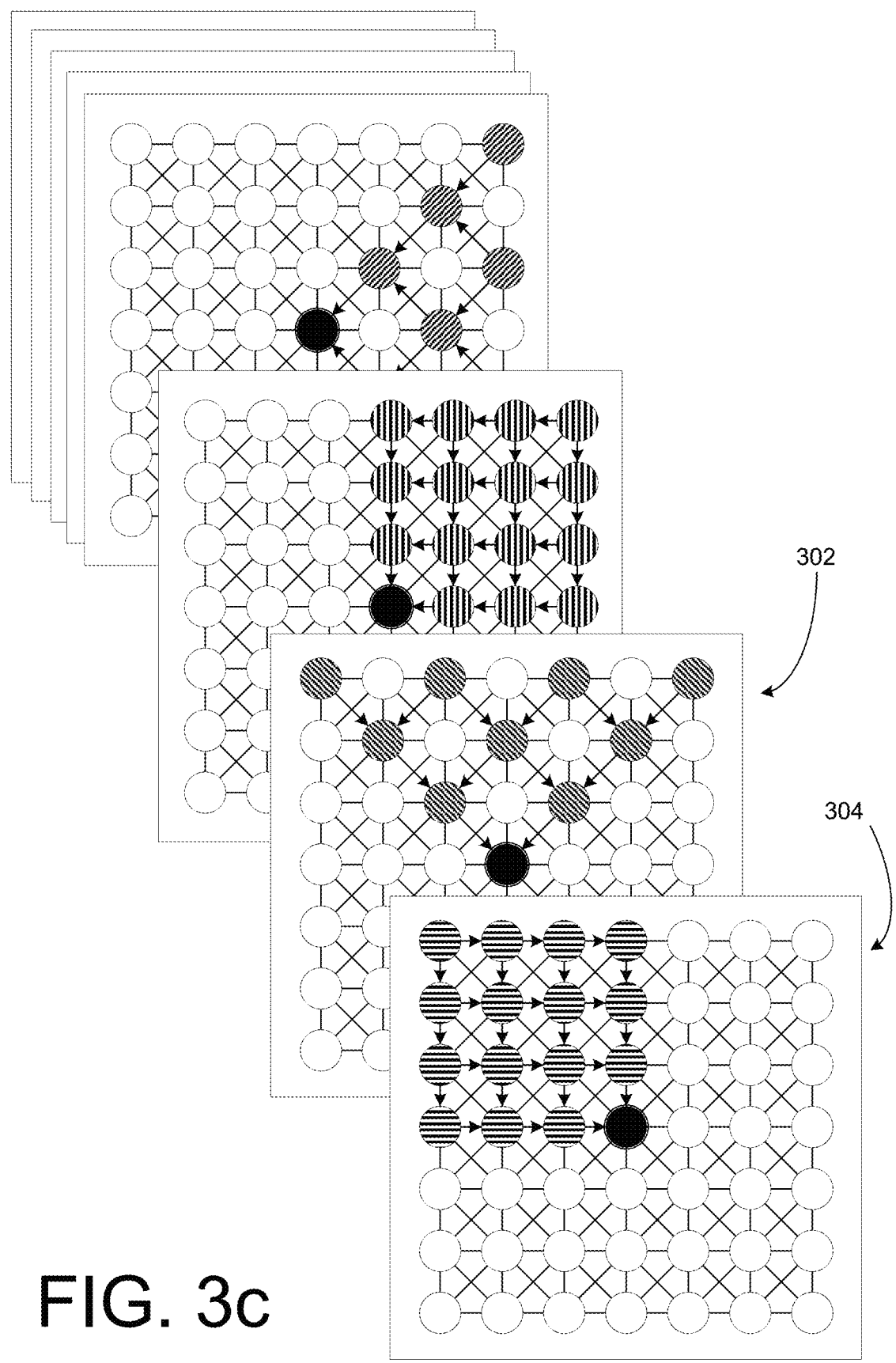

FIG. 3C show the pixels that MGM would use for the same scan lines (see Section 2.2 below).

Figure 3D:
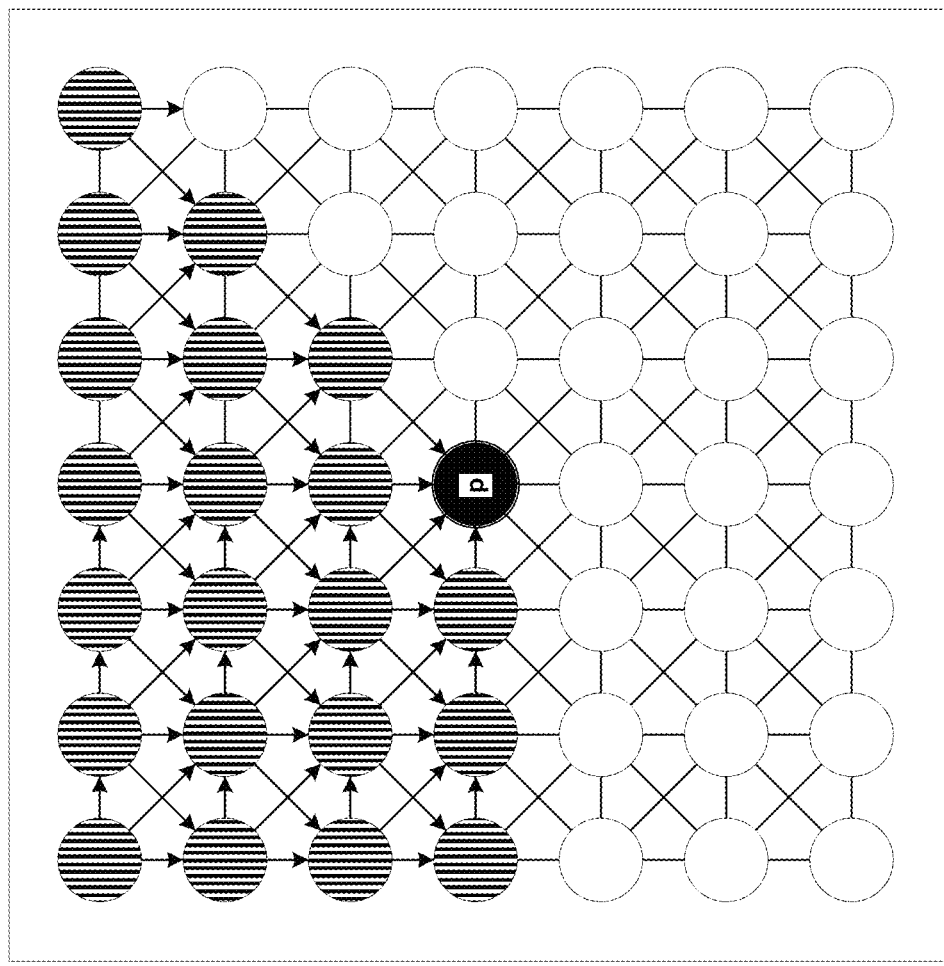

Finally, FIG. 3D shows the pixels used to compute a single cost term in accordance with the described embodiments of the invention—adopting what is referred to herein as an $R^3SGM$ approach. The $R^3SGM$ approach is able to estimate disparities whilst processing pixels in a streaming fashion. Note that to compute the single cost vector associated with the black pixel, only the cost vectors from pixels that precede it in raster order are required. See Section 3 below for more details.

R3SGM provides a novel variant of the semi-global matching algorithm which is real-time, raster-respecting and suitable for power-constrained systems. It is highly conducive to implementation on an FPGA or circuit-based platform or other embedded device.

2.1 Semi-Global Matching (SGM)

SGM is a popular stereo matching method, owing to the good balance it achieves between accuracy and computational cost. It aims to find a disparity map D that minimises the following energy function, defined on an undirected graph G=(I, ε), with I the image domain and ε a set of edges defined by the 8-connectivity rule:

$$E(D) = \sum_{p \in I} C_p(D(p)) + \sum_{\{p,q\} \in \varepsilon} V(D(p), D(q)) \quad (1)$$

Pixel connectivity defines how pixels relate to their neighbours. An 8-connected pixel is a neighbour to every pixel that "touches" its edges and corners, i.e. which is immediately adjacent to it horizontally, vertically or diagonally. Hence, the set ε contains every pair of pixels that are horizontal, vertical or diagonal neighbours.

Each unary term $C_p(D(p))$ represents a 'matching cost' of assigning pixel p in the left image L the disparity $D(p) \in \mathcal{D}$, where $\mathcal{D}=[0, d_{max}]$ is the range of possible disparities that may be assigned to any pixel. An assigned disparity of D(p) would match pixel p in the left image L with the following pixel in the right image R:

$$p-D(p)i$$

where $i=[1,0]^T$ i.e. the unit horizontal vector lying parallel to the pixel rows in the direction of increasing pixel index. The choice of matching function is typically based on (i) the desired invariances to nuisances (e.g. changes in illumination) and (ii) computational requirements.

The notation $C_p(\bullet)$ is used to denote a unary cost vector having $d_{max}+1$ components, the dth component of which is $C_p(d)$, i.e. the matching cost of assigning pixel p the disparity d.

Each pairwise term V(D(p), D(q)) encourages smoothness by penalising disparity variations between neighbouring pixels:

$$V(d, d') = \begin{cases} 0 & \text{if } d = d' \\ P_1 & \text{if } |d - d'| = 1 \\ P_2 & \text{otherwise} \end{cases} \quad (2)$$

The penalty $P_1$ is typically smaller than $P_2$, to avoid over-penalising gradual disparity changes, e.g. on slanted or curved surfaces. By contrast, $P_2$ tends to be larger, so as to more strongly discourage significant jumps in disparity.

Since the minimisation problem posed by Equation 1 is NP-hard, and thus computationally intractable in many practical contexts, SGM approximates its solution by splitting it into several independent 1-dimensional (1D) problems defined along scan lines. More specifically, it associates each pixel p in the image with 8 scan lines, each of which follows one of eight cardinal directions (0°, 45°, . . . , 315°), as per FIG. 3a.

FIG. 3a shows a schematic block diagram of a portion of an image, in which individual pixels are represented by circles. The pixels are arranged in a two-dimensional grid, and pixels lying along the eight scan lines associated with pixel p (denoted by the black circle in the grid) are denoted by pixels shaded according to the scheme set out Table 1 below.

These eight scan lines can be denoted as a vector set $R \subseteq \mathbb{R}^2$:

$$R = \left\{ \begin{bmatrix} 1 \\ 0 \end{bmatrix}, \begin{bmatrix} 1 \\ 1 \end{bmatrix}, \begin{bmatrix} 0 \\ 1 \end{bmatrix}, \begin{bmatrix} -1 \\ 1 \end{bmatrix}, \begin{bmatrix} -1 \\ 0 \end{bmatrix}, \begin{bmatrix} -1 \\ -1 \end{bmatrix}, \begin{bmatrix} 0 \\ -1 \end{bmatrix}, \begin{bmatrix} 1 \\ -1 \end{bmatrix} \right\}. \quad (3)$$

Table 1 shows indicates which vector in R corresponds to each scan direction, using the notation $i=[0,1]^T$ and $j=[1,0]^T$ to denote the vertically downward and left direction vectors respectively.

TABLE 1

The eight possible scan-line directions and the scheme used to represent them in FIGS. 3A-D and 4.

| Angle | Scan Direction | Direction Vector r ∈ R | Shading |
|---|---|---|---|
| 0° | Vertically Down/South (S) | ↓ = j = $[0, 1]^T$ | Vertical hatch |
| 45° | Right-Down Diagonal/South-East (SE) | ↘ = $[1, 1]^T$ | SE diagonal hatch |
| 90° | Right/East (E) | → = i = $[1, 0]^T$ | Horizontal hatch |
| 135° | Right-Up Diagonal/North-East (NE) | ↗ = $[1, -1]^T$ | Chequered |
| 180° | Up/North (N) | ↑ = $[0, -1]^T$ | NS crosshatch |
| 225° | Left-Up/North-West (NW) | ↖ = $[-1, -1]^T$ | Dotted |
| 270° | Left/West (W) | ↑ = $[-1, 0]^T$ | Diagonal crosshatch |
| 315° | Left-Down/South-West (SW) | ↙ = $[-1, 1]^T$ | SW diagonal hatch |

Each pixel p is then associated with a directional cost $L_r(p,d)$ for each direction $r \in R$ and each disparity d. These costs can be computed recursively via $$L_r(p, d) = C_p(d) + \min_{d' \in \mathcal{D}} (L_r(p - r, d') + V(d, d')) - \min_{d' \in \mathcal{D}} L_r(p - r, d'), \quad (4)$$

in which p−r refers to the pixel preceding p along the scan line denoted by r. The minimum $L_r$ cost associated with p−r is subtracted from all costs computed for p to prevent them growing without bound as the distance from the image edge increases.

The notation $L_r(p, \bullet)$ is used to denote an "intermediate" (directional) cost vector for pixel p and scan line r, which in the present example has $d_{max}+1$ components, the dth component of which is $L_r(p,d)$.

Having computed the directional costs, SGM then sums them to form an aggregated cost volume:

$$L(p, d) = \sum_{r \in R} L_r(p, d) \quad (5)$$

The notation $L(p, \bullet)$ denotes a "final" disparity cost vector for pixel p, which in the present example has $d_{max}+1$ components, the dth component of which is L(p,d).

Finally, it selects each pixel's disparity using a Winner-Takes-All (WTA) approach to estimate a disparity map D*:

$$D^*(p) = \operatorname*{argmin}_{d \in \mathcal{D}} L(p, d) \quad (6)$$

In other words, the disparity D*(p) assigned to pixel p is the smallest component of the final cost vector L(p, •) for that pixel.

The disparities estimated by SGM only approximate the solution of the initial problem of Equation 1 (which would need a smoothness term to be enforced over the whole image grid) but they are much less demanding to compute and, despite causing streaking artifacts in the final disparity image, have been proven to be accurate enough for some practical purposes.

One technique that may be used to filter out incorrect disparity values is an LR consistency check, which involves computing the disparities not just of pixels in the left image, but also in the right image, and checking that the two match (e.g. checking that if p in the left image has disparity d, then so does pixel p−di in the right image). In other words, stereo depth estimation is performed twice for each image pair— once with the left image as the target and the right image as the reference, and once with the right image as the target and the left image as the reference—and the results are compared to remove depth pixels which do not meet a defined consistency condition.

Observe that the disparities of pixels in the right image have the opposite sign, i.e. that assigning pixel p' in the right image a disparity of d matches it with pixel p'+di in the left image.

Regardless of whether LR consistency checking is used or not, though, SGM has drawbacks:
(i) as mentioned earlier, it suffers from streaking in textureless/repetitive regions (which LR checks can mitigate but do not solve),
(ii) there is a need to store the entire unary cost image (or images, when checking), to allow the computation of the directional contributions to the final cost, and
(iii) there is a need for multiple passes over the data, to recursively compute the directional components used in Equation 5.

To deploy SGM on a limited-memory platform, e.g. an FPGA, some compromises must be made, as will now be discussed.

2.1.1 SGM on FPGAs

Due to the recursive term in Equation 4, the directional cost for a given scan line r and a given pixel p cannot be computed until the directional cost(s) for all pixels preceding p on the scan line r to the edge of the image to have been computed. In other words, the direction cost for the first pixel on the scan line r at the edge of the image must be computed first, and then the directional costs for successive pixels along the scan line r need to be computed in turn.

As the computation of the directional costs for a pixel requires the cost function for all pixels along the scan line (from the edge of the image) to have been computed already, an FPGA implementation of SGM will typically focus only on the scan lines that would be completely available when evaluating a pixel. If pixels in the images are available in raster order, then these will be the three scan lines leading into the pixel from above, and the one leading into it from its left (see FIG. 3b). In the present example, pixels are provided in a time sequence (stream) from left to right, starting with the first column (so starting at the top-left corner of the image) and then in the same manner for the next column vertically below that column until the bottom-right corner of the image is reached).

Observe from Equation 4 that to compute the directional costs for a pixel p along a scan line r, only its unaries $C_p$ and the directional cost vector $L_r(p-r, •)$ associated with its predecessor p−r are required. Hence, restricting SGM to the four directions indicated in FIG. 3b means that only the directional cost vectors for pixels which have already been received (before pixel p) are required in order to assign a disparity to pixel p.

Memory requirements are also a constraint for implementations on accelerated platforms: when processing pixels in raster order, temporary storage is required for the directional costs $L_r$ associated with every predecessor of the pixel p being evaluated, so the more scan lines that are considered, the more storage is required from the FPGA fabric. Due to the limited resources available on FPGAs, the choice to limit the number of scan lines thus not only allows the processing of pixels in raster order, but also to keeps the complexity of the design low enough to be deployed on such circuits.

2.2 More Global Matching (MGM)

The streaking effect that afflicts SGM is caused by the star-shaped pattern used when computing the directional costs (see FIG. 3a): this makes the disparity computed for each pixel depend only on a star-shaped region of the image. To encourage neighbouring pixels to have similar disparities, SGM relies on their 'regions of influence' overlapping; however, if the areas in which they overlap are un-informative (e.g. due to limited/repetitive texture), this effect is lost. As a result, if the contributions from some scan lines are weak, whilst those from others are strong, the disparities of pixels along the stronger lines will tend to be similar, whilst there may be little correlation along the weaker scan lines: this can lead to streaking. This is an inherent limitation of SGM, and one that is only accentuated by removing scan lines, as is FIG. 3b.

As indicated above, a recent extension of SGM reduces streaking by incorporating information from multiple directions into the costs associated with each scan line. To do this, Equation 4 is modified to additionally use the cost vectors of pixels on the previous scan line: see FIG. 3c. More specifically, when computing the cost vector $L_r(p, •)$ for pixel p and direction r, the cost vector computed for the pixel p−r™ "above" it where "above" is defined relative to r, and has the usual meaning when r is horizontal.

Figure 4:
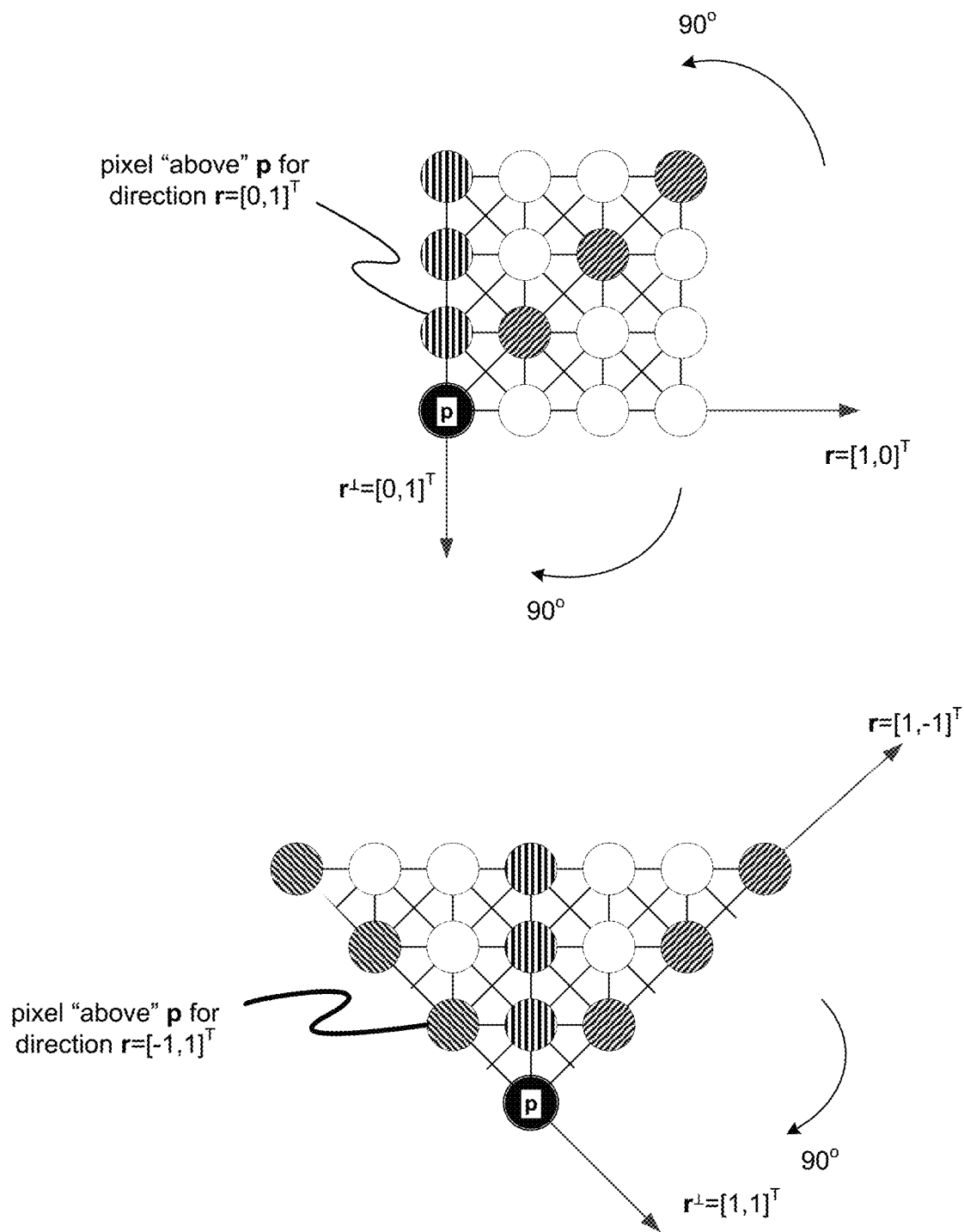
FIG. 4 shows how a perpendicular direction to a scan line is defined.

As shown by example in FIG. 4, $r^\perp$ is defined here as the vector in R which lies 90° clockwise from r and the pixel above p for direction r is neighbour to p (i.e. the closest pixel to p) in the direction $-r^\perp$.

Equation 4 then becomes:

$$L_r(p, d) = C_p(d) + \frac{1}{2} \sum_{x \in \{r, r^\perp\}} \min_{d' \in \mathcal{D}} (L_r(p - x, d') + V(d, d')) \qquad (7)$$

This approach has been shown to be more accurate than SGM, whilst running at a similar speed. However, unfortunately, the directional costs are hard to compute on accelerated platforms, and so MGM cannot easily be sped up to obtain a real-time, power-efficient algorithm.

That is, whilst MGM is very effective at removing streaking, since all but two of its directional minimisations (specifically, as denoted by reference numerals 302 and 304 in FIG. 3c, for which $r=[1, 0]^T$ and $r=[1, 1]^T$ respectively) rely on pixels that would not be available when streaming the image in raster order, a full implementation of the algorithm on an FPGA is difficult to achieve (see Section 2.1.1).

One solution to this might be to implement a cut-down version of MGM that only uses those of its directional minimisations that do work on an FPGA (i.e. 302 and 302 in FIG. 3c), thereby minoring one way in which SGM has been adapted for FPGA deployment. However, if the algorithm were to be limited to one of MGM's directional minimisations (e.g. 304), then the 'region of influence' of each pixel shrinks, resulting in poorer disparities, and if both are used, then double the amount of memory is required to store the cost vectors (see Section 2.1.1).

3. Forward Pass R³SGM

To avoid these problems, a compromise approach is adopted—referred to herein as "R³SGM"—which is inspired by the way in which MGM allows each directional cost for a pixel to be influenced by neighbouring pixels in more than one direction to mitigate streaking.

R³SGM approach uses only a single directional minimisation, but one that incorporates information from all of the directions that are available when processing in raster order. This approach is inherently raster-friendly, and requires a minimal amount of memory on the FPGA. When processing the image in raster order, the cost vector for each pixel is computed by accumulating contributions from the four of its eight neighbours that have already been "visited" and had their costs computed (the left, top-left, top and top-right neighbours, as per FIG. 3d). Formally, defining a set of four raster-friendly directions as $$X = \{\rightarrow, \searrow, \downarrow, \swarrow\} = \left\{\begin{bmatrix}1\\0\end{bmatrix}, \begin{bmatrix}1\\1\end{bmatrix}, \begin{bmatrix}0\\1\end{bmatrix}, \begin{bmatrix}-1\\1\end{bmatrix}\right\}, \quad (8)$$

then the cost vector L(p, •) associated with each pixel can be computed via:

$$L(p, d) = \quad (9)$$
$$C_p(d) + \frac{1}{|X|}\sum_{x \in X}\left(\min_{d' \in \mathcal{D}}(L(p-x, d') + V(d, d')) - \min_{d' \in \mathcal{D}}(L(p-x, d'))\right).$$

Since, unlike SGM and MGM, only using a single minimisation is used, this is equivalent to Equation 5 in those approaches—effectively "bypassing" the intermediate computations of Equation 4 (i.e. removing the need for directional cost vectors altogether)—allowing the cost vector for each pixel to be obtained directly in a single pass over the image.

The second term in Equation 9 is an aggregate cost term which combines the cost vectors L(p–x, •) over multiple directions x ∈ X, when in turn is combined with the unary cost vector of the first term. The unary cost values $C_p(d)$ are an example of matching costs (similarity scores) for the different disparities d ∈ $\mathcal{D}$, as that terminology is used herein.

The Census Transform (CT) is used to compute the unaries $C_p$. CT is robust to illumination changes between the images, and can be computed efficiently and in a raster-friendly way (see Section 3.1.1 below). Moreover, the Hamming distance between two CT feature vectors can be computed efficiently, and provides a good measure of their similarity.

Further details of the Census Transform may be found in R. Zabih and J. Woodfill. Non-parametric Local Transforms for Computing Visual Correspondence, in ECCV, pages 151-158, 1994, which is incorporated herein by reference in its entirety.

The pixel costs L(p,d) are computed simultaneously for both the left and right images using the FPGA implementation described below in Section 3.1.2). After selecting the best disparity in each image with a WTA approach, the disparities are processed with a median filter (in a raster-friendly way) to reduce noise in the output. Finally, the disparities are validated with an LR check to discard inconsistent results, using a threshold of 1 disparity or 3%, whichever is greater.

3.1. FPGA Implementation

This section demonstrated how the above approach can be implemented on an FPGA. By contrast to the previous sections, which only refer to the computation of the disparities for pixels in the left image, the described implementation computes the disparities for the pixels in both images efficiently to support LR consistency checking (see Section 2.1). Notationally, a distinction is made between the unary costs and cost vectors for the two images using the superscripts ($\mathcal{L}$) and ($\mathcal{R}$).

Two main steps are involved: (i) the computation of the unary costs $c_p^{(\mathcal{L})}$(•) and $c_p^{(\mathcal{R})}$(•), and (ii) the recursive computation of the cost vectors $L^{(\mathcal{L})}$(p, •) and $L^{(\mathcal{R})}$(p, •).

At the hardware level, an FPGA is formed of a set of programmable logic blocks that can be wired together (via connection pathways) in different ways and independently programmed to perform different functions. This architecture naturally lends itself to an efficient pipeline-processing style, in which data is fed into the FPGA in a stream and different logic blocks try to operate on different pieces of data concurrently in each time step. In practice, the steps considered herein here all involve processing images, with the data associated with the images' pixels being streamed into the FPGA in raster order, as will now be described.

The logic blocks and connection pathways are configured by circuit description code, such as register-transfer level (RTL) code, which is provided to the FPGA.

3.1.1 Unary Computation

Each unary $c_p^{(\mathcal{L})}$(d), which denotes the cost of assigning pixel p in the left image a disparity of d, is computed as the Hamming distance $\mathcal{H}$ between a feature vector $\phi^{(\mathcal{L})}$(p) associated with pixel p in the left image and a feature vector $\phi^{(\mathcal{R})}$(p–di) associated with pixel p–di in the right image.

The feature vector $\phi^{(\mathcal{L})}$(p) is computed by applying the Census Transform to a W×W window around p in the left image, and analogously for $\phi^{(\mathcal{R})}$.

Conversely, $c_p^{(\mathcal{R})}$(d) becomes the Hamming distance between $\phi^{(\mathcal{R})}$(p) and $\phi^{(\mathcal{L})}$(p+di).

Figure 5:
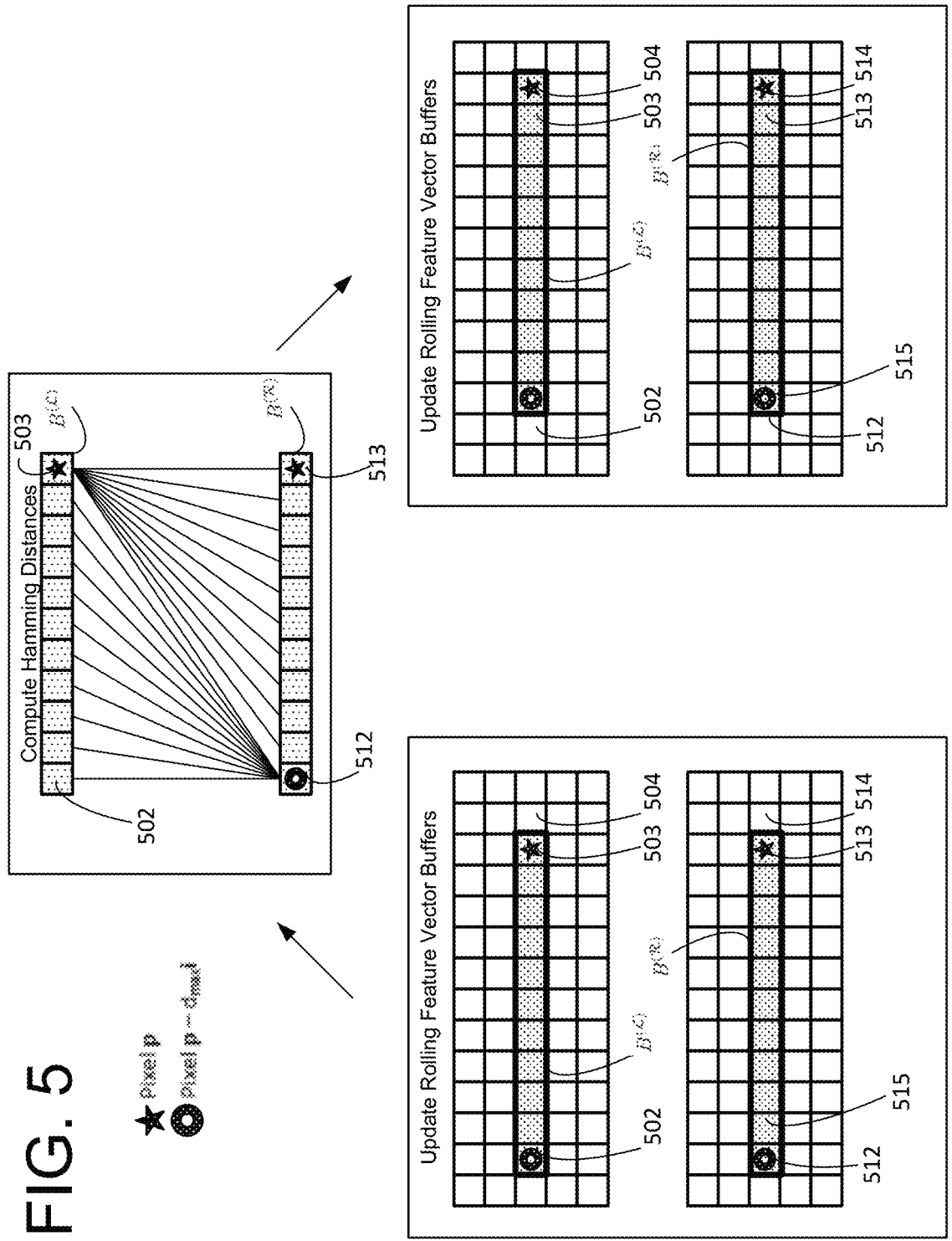
FIG. 5 shows how feature vectors may be stored for the purpose of evaluating unary costs.

As shown in FIG. 5, the left and right images are traversed simultaneously in raster order, computing $\phi^{(\mathcal{L})}$(p) and $\phi^{(\mathcal{R})}$(p) for each pixel p at the same stage in the traversal of the pixels. Rolling buffers of feature vectors for the most recent $d_{max}$+1 pixels in each image are retained, i.e.

$$B^{(\mathcal{L})} = \phi^{(\mathcal{L})}(p-di): d \in \mathcal{D}],$$

and analogously for the right image. After computing the feature vectors for pixel p, unaries are computed for all d ∈ D as follows:

$$c_p^{(\mathcal{L})}(d) = \mathcal{H}(\phi^{(\mathcal{L})}(p), \phi^{(\mathcal{R})}(p-di))$$
$$c_{p-d_{max}i}^{(\mathcal{R})}(d) = \mathcal{H}(\phi^{(\mathcal{L})}(p+(d-d_{max})i), \phi^{(\mathcal{R})}(p-d_{max}i)) \quad (10)$$

Note that the unaries for right image pixels are computed just before they leave the right buffer $\mathcal{B}^{(\mathcal{R})}$ since it is only at that point that the feature vectors for all of the relevant left image pixels have been accumulated in the buffer $\mathcal{B}^{(\mathcal{L})}$ (see FIG. 5).

FIG. 5 illustrates how, in order to compute the unaries, at each pixel p, $\phi^{(\mathcal{R})}$(p) and $\phi^{(\mathcal{L})}$ are computed and then used to update the rolling buffers $B^{(\mathcal{L})}$ and $B^{(\mathcal{R})}$ (feature buffers). The unaries $c_p^{(\mathcal{L})}$(d) and $c_{p-d_{max}i}^{(\mathcal{R})}(d)$ for all d ∈ $\mathcal{D}$ are computed as the Hamming distances between the relevant feature vectors (see Equation 10) before moving on to the next pixel.

In the lower part of FIG. 5, at the left and right hand sides respectively, the contents of the left and right feature vector buffers $B^{(L)}$ and $B^{(R)}$ are shown at sequential stages of the traversal. Each buffer holds the feature vector of a "current" pixel p in that image. Pixel p in the left image is the pixel for which the unaries are being computed in the current stag. IN addition, the buffers hold the $d_{max}$ pixels to the left of p in the same row. As shown in the top half of the figure, a set of $d_{max}+1$ Hamming distances are computed as per equation 10 for pixel p in the left image L and pixel $p-d_{max}i$ in the right image $\mathcal{R}$. That is to say, the processing of the right image is delayed relative to that of the left image by $d_{max}$ pixels, i.e. the unaries are computed for pixel p in the left image at the same stage of the processing as the unaries are computed for pixel $p-d_{max}i$ in the right image.

As can be seen, at the next stage, the context of the buffers has shifted by one pixel: in the earlier stage, pixel p of the left (resp. right) image is the pixel denoted by reference numeral 503 (rep. 513), and pixel $p-d_{max}i$ is the pixel denoted by reference numeral 502 (resp. 512); whereas, in the next stage, the pixel to the immediate right of pixel 503 (resp. 513), as denoted by reference numeral 504 (resp. 514) has entered the left (resp. right) buffer and pixel 502 (resp. 512) has left it. Pixel 504 in the left image is now the current pixel p for which unaries are computed in the next stage, and the pixel denoted by reference numeral 515 in the right image (immediately to the right of pixel 512) is now pixel $p-d_{max}i$ for which unaries are simultaneously computed.

In practice, to efficiently compute the feature vectors, a W×W window of the pixels surrounding p that can be used to compute the Census Transform are maintained.

Figure 6:
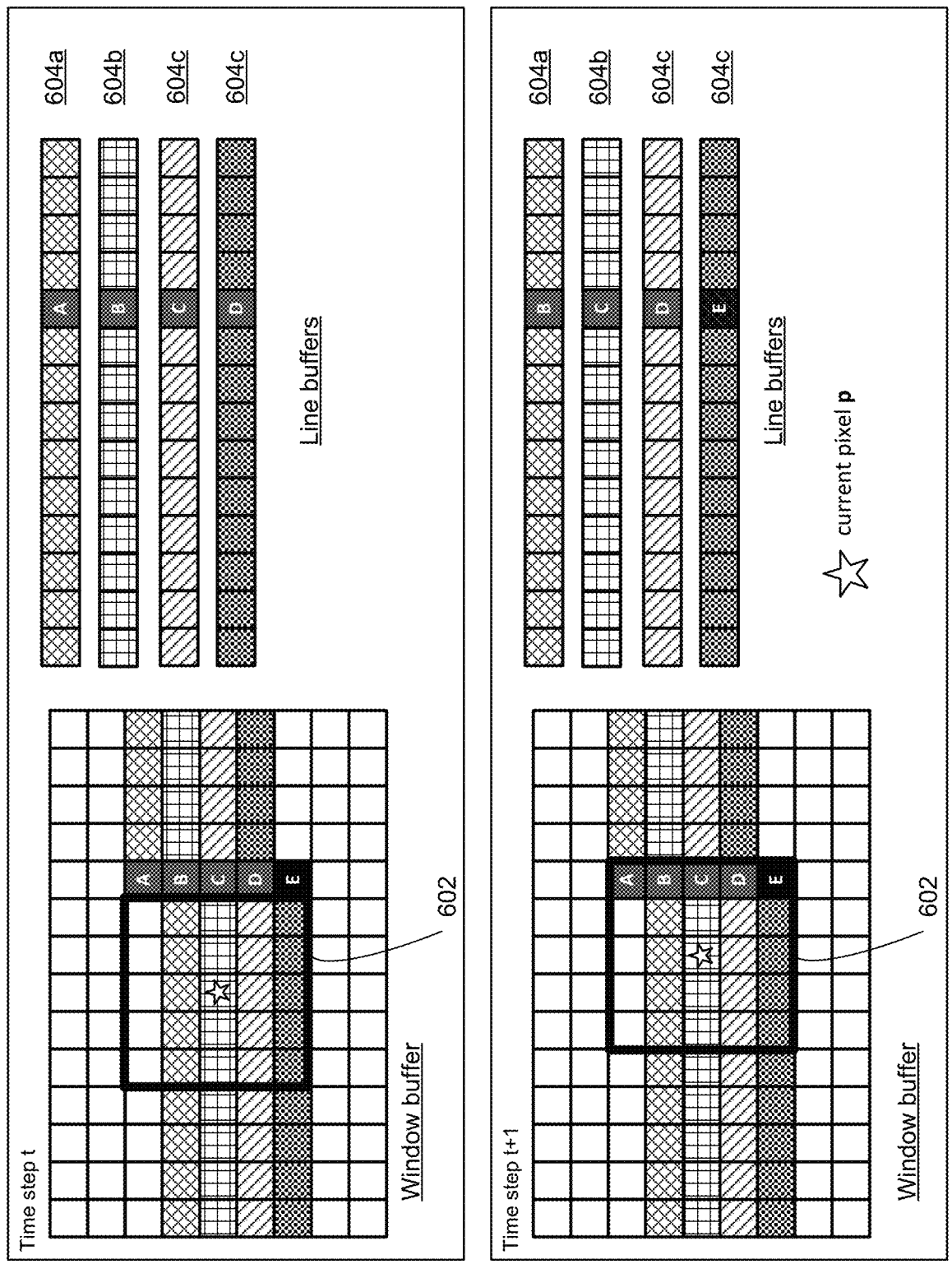
FIG. 6 shows how pixel values may be stored for the purpose of determining feature vectors.

FIG. 6 shows a set of buffers used to facilitate the computation of the Census Transform feature vectors (pixel buffers), and how they are updated from one pixel to the next.

As shown in FIG. 6, the window of pixels is stored in a window buffer 602 (local registers on an FPGA that can be used to store data to which instantaneous access is needed). To keep the window buffer full, the algorithm reads ahead of p by slightly over [W/2] rows, where $\lfloor \bullet \rfloor$ denoted the floor function. Separately, pixels from the rows above/below p are maintained in line buffers 604a-d (regions of memory on an FPGA that can store larger amounts of data but can only provide a single value per time step).

In this case, the height of the window buffer is W=5, and four line buffers are provided (1 to 4) denoted by reference numerals 604a-d respectively.

As shown in FIG. 6, some pixels may be held simultaneously in both the window buffer 602 and one of the line buffers 604a-d (each of which is the size of the width of the image). When moving from one pixel to the next, the window buffer 602 and line buffers 604a-d are updated as shown in FIG. 6. Notice the way in which the individually marked pixels A-D in the line buffers 604a-d respectively are shifted "upwards", into the preceding line buffer to make way for the new pixel (E) that is being read in (to both the fourth line buffer 604d and the window buffer 602), and how pixel A is removed from the first line buffer 602a but added to the top-right of the window buffer 604. All of these operations can be implemented very efficiently on an FPGA.

3.1.2 Cost Vector Computation

Once the unaries have been computed, the next step is to compute the L(p,d) values (i.e. the cost vector) for each pixel using Equation 9. This again involves a walk over the image domain in raster order. In this case, computing the cost vector for each pixel p uses the cost vectors of the pixels p−x, for each x ∈ X (i.e. the three pixels immediately above p and the pixel to its immediate left). Therefore these must be in memory when the cost vector for p is computed.

Figure 7:
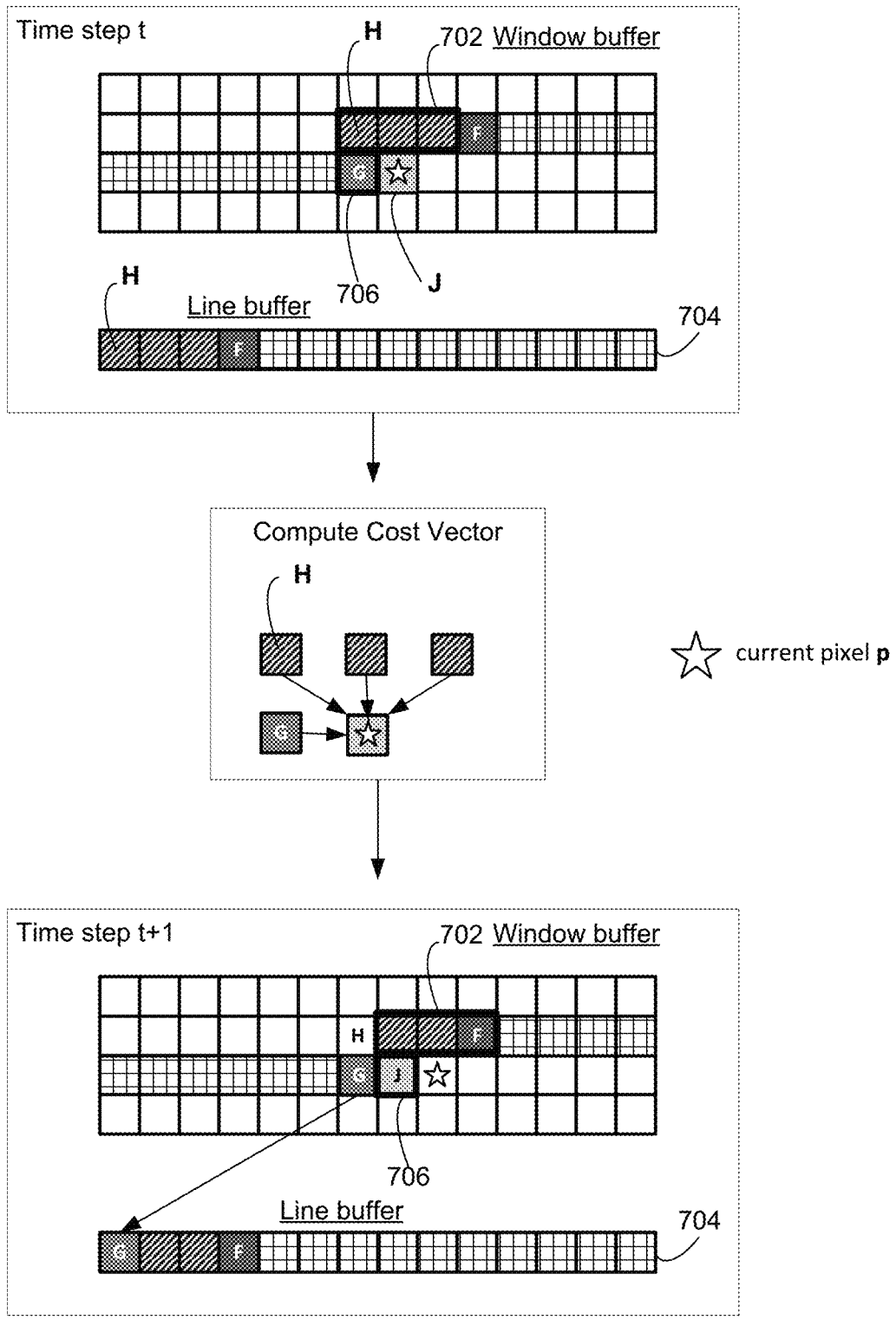
FIG. 7 illustrates the dependency of a final disparity cost vector for a current pixel on the final disparity cost vectors assigned to its neighbouring pixels, and how the latter may be stored accordingly.

FIG. 7 shows a set of buffers used to facilitate the computation of the cost vectors (cost buffers), and how they are updated from one pixel to the next. In the example of FIG. 7, the cost vector for the pixel labelled J is computed at time step t, i.e. J is the current pixel p at time step t. The pixel immediately to the right of J becomes the current pixel at time step t+1.

In practice, as shown in FIG. 7, the relevant cost vectors are divided between several different locations in memory: (i) a line buffer 704 whose size is equal to the width of the image, (ii) a window buffer 702 that holds the cost vectors for the three neighbouring pixels above the current pixel p, and (iii) a register 706 that holds the cost vector for the pixel to the left of p—so the cost for the pixel labelled G at time step t and the cost for pixel J itself at time step t+1, as computed in the preceding time step t. This provides instantaneous access to the cost vectors that are needed to compute the cost vector for p, whilst keeping track of the cost vectors for the pixels that will be needed to compute the cost vectors for upcoming pixels (via the line buffer 704). When moving from one pixel to the next, the window buffer 702 and line buffer 704 are updated as shown in FIG. 7, with the result that the cost for pixel H is removed from both the line buffer 704 and the window buffer 702. Pixel F replaces pixel H in the window buffer and pixel G replaces pixel H in the line buffer 704. The register 706 is updated to replace the cost computed in the previous time step with the cost computed in the current time step, ready for the next time step.

The window buffers 602, 702 can be implemented as one or more lookup tables (LUTs) or a set of registers or flip-flops etc.

The line buffers 604, 704 can for example be implemented as dual-port memory blocks (e.g. random access memory) to allow singe-value read and write access simultaneously.

Equation 9 is re-written to reflect the actual computation of L(p,d) as:

$$L(p, d) = C_p(d) + \frac{1}{|X|} \qquad (11)$$

$$\sum_{x \in X} \Big( \min\{L(p-x, d), L(p-x, d-1) + P_1, L(p-x, d+1) + P_1,$$

$$\min_{d' \in \mathcal{D}} (L(p-x, d') + P_2)\} - \min_{d' \in \mathcal{D}} (L(p-x, d')) \Big).$$

This allows for a more optimal implementation in which $$\min_{d' \in \mathcal{D}} (L(p-x, d'))$$

is computed once and stored to avoid repeat computations.

According to the terminology used herein, the term:

$L(p,d)$ as used above is an example of what is referred to herein as a final disparity cost for pixel p and disparity d. These final disparity costs for all of the different disparities d ∈ $\mathcal{D}$ under consideration (candidate disparities) constitute a final disparity cost vector for pixel p, and are referred to as cost components of the final disparity cost vector herein. This cost vector is final in that the disparity that is assigned to pixel p, denoted D*(p), is the disparity corresponding to its lowest cost component, i.e.:

$$D^*(p) = \underset{d \in \mathcal{D}}{\mathrm{argmin}}\, L(p, d).$$

By contrast, in the context of MGM and SGM, the cost components:

$L_r(p,d)$, (with the r subscript) as would be computed for the different cardinal directions r in SGM or MGM, form intermediate cost vectors, because the disparity is not assigned from any of these directly. In that case, the intermediate cost components for each disparity that are obtained from independent directions of aggregation are combined to give a final cost component for disparity d as per Equation 4, which, in turn, is used to assign the disparity to pixel p as per Equation 5.

What is more, in MGM and SGM, it is the intermediate costs $L_r(p,d)$ that have been computed for adjacent pixels in a target image that are used to compute the cost vector for the current pixel. As indicated, the present disclosure recognizes this as a significant source of inefficiency, because it requires multiple disparity cost vectors to be stored for each pixel (one for each cardinal direction—so eight intermediate cost vectors for a full eight direction implementation, each having $|\mathcal{D}|$ components), and used in the computation of the cost vectors for the adjacent pixels. Not only does this increase the memory requirements significantly, in CPU/GPU implementation it also limits the speed at which the processing can be performed, as it requires a relatively large number of data accesses in order to compute the cost vector for each pixel. It also acts as a barrier to an efficient FPGA/circuit implementation, for the reasons explained above.

R³SGM solves these problems by instead computing the final disparity cost vector for each pixel of the target image directly from the final disparity cost vectors of one or more of the adjacent pixels in the target image. This allows the image processing to be performed much faster, with reduced memory requirements—as only a single disparity cost vector needs to be stored per pixel (i.e. one vector having $|\mathcal{D}|$ components)—whilst still achieving an acceptable level of accuracy.

Recursion loops can be avoided by considering only "previous" pixel directions. That is, by taking into account, in computing the cost vector for any given pixel, only cost vector(s) that have already been computed for previous pixels (if any—see below for edge cases).

Preferably, for an image streamed in raster order, the final disparity cost vector for each pixel is computed using all of the available final disparity cost vectors for the adjacent pixels, which in the case of an image that is rastered from top left, is the pixel to the left of the current pixel in the same scan line, and the three pixels adjacent to it in the scan line above it. This incorporates the maximum amount of information about neighbouring pixels, thus giving the most accurate results that can be obtained, without comprising the speed and efficiency of the algorithm.

R³SGM is particularly well-suited to an efficient FPGA/embedded implementation, and in that context the reduced memory requirements translate to fewer memory blocks (for buffering/saving past results) and fewer logic blocks due to the lower complexity. The overall effect is that the invention can be implemented with a particularly "lean" (efficient), and therefore fast-operating, circuit/design.

In the embodiments described above, the disparity cost vector for the top-left pixel (the very first pixel for an image rastered from top-left) will be computed from only the matching disparity costs $C_p(d)$ for that pixel. There will also be a number of pixels running along the top and down the left-hand side of the image where the number of adjacent pixels for which disparity cost vectors have already been computed is less than four. Hence only a subset of the pixels will have disparity cost vectors that take into account the disparity cost vectors of four adjacent pixels.

It is also noted that the term "lowest cost component" corresponds to the disparity that is overall penalized the least (i.e. the most promising disparity based on the criteria being applied), irrespective of how that cost may be represented (for example, in the above, the lowest cost corresponds to the minimum-valued component, but alternatively a lower cost (penalty) could be represented using a higher numerical value, in which case the lost cost component would be the maximum-valued component).

In Fast R3SGM, the pixel to the left is omitted from the cost smoothing—i.e. the direction "→" is omitted from X in Equations 8 and 9, such that the sum is now over X= $\{\searrow \downarrow, \swarrow\}$—and the smoothed cost of the current pixel is computed from only the top-most neighbouring pixels of the previous scan line (from the S, SE and SW directions) whose cost vectors are held the window buffer 702. This means the register 706, for the cost vector of the pixel immediately to the left of the current pixel in the same scan line, can be omitted, and the cost vector of the left pixel may simply be held in the line buffer 704 until it needs to be moved to the window buffer 702, in the same way as the other intervening pixels. This removes the dependence on pixel "G" in FIG. 7.

3.2 Directional Bias

The form of R3SGM described above is one example of "forward pass" cost smoothing. That is to say, smoothing of a "raw" cost vector (e.g. $C_p(d)$ in Equation 9 over the given range of disparity values $\mathcal{D}$) based on one or more preceding pixels in the target image stream but not any subsequent pixel. A smoothed cost vector resulting from forward pass cost smoothing (e.g. L(p,d) in Equation 9) may be referred to as a forward pass cost vector.

One issue with considering only preceding pixel(s) is that it can lead to a form of directional bias, due to the increased influence of pixels towards the top of the images. This may also be referred to as raster-scan bias in the case of pixels streamed in raster order.

4. Reverse Pass R3SGM

FIG. 8 shows a schematic block diagram for an in-stream processing system 800, which has the benefit of being highly conducive to embedded implementation. The processing system 800 is shown to comprise a forward pass (FP) stage 802, a reverse pass (RP) stage 804, and a disparity estimation component 808.

The forward pass stage 802 applies R3SGM as described above, with the additional "reverse pass" stage 804 countering the directional bias of the forward pass stage 802. A particular benefit of the reverse pass stage 804 is that, like the forward pass stage 802, it can be implemented in an in-stream fashion, i.e. it does not require full cost volumes to be computed over the target image, but can begin computing reverse pass cost vectors for earlier pixels whilst later pixels are still being processed in the forward pass stage 802.

A delay block architecture is used within the reverse pass stage, that restricts the reverse pass influence to a predetermined number of pixel rows below the current pixel, where that number is determined by the number of delay blocks. This is one approximation that is made to achieve in-stream processing. This is described in further detail below. Testing through simulation has demonstrated an acceptable trade-off between accuracy and the significant improvement in efficiency that stems from the ability to use in-stream processing.

The term "cost volume" is used to refer to a set of cost vectors (raw, forward pass, or reverse pass) over all or part of the target image. A reverse pass stage 804 receives, from the forward pass stage 802, the raw cost volume (the raw disparity costs $C_p(d)$ are retained for use in the reverse pass stage 804) and the forward pass cost volume, as respective streams of raw/forward pass cost vectors (cost streams). The in-stream nature of the reverse pass processing means that the reverse pass stage can compute reverse pass cost vectors for earlier pixels of the target image whilst the raw and forward pass cost streams are still being received, and before the forward pass stage 802 has computed raw and forward pass cost vectors for subsequent pixels of the target image. It is therefore not required to buffer any full images in order to perform the forward and reverse pass cost smoothing.

The final step of assigning disparity vales to the pixels is deferred to after the reverse pass stage, and is now based on a combined disparity cost vector for each pixel, component d of which (i.e. the value of dimension d) is defined as:

$$E(p,d)=F(p,d)+R(p,d), \quad (12)$$

where $F(p,d):=L(p,d)$ is the corresponding component of the forward pass cost vector computed as per Equation 9, using the forward pass R3SGM processing described in section 3 above, and $R(p,d)$ represents the corresponding dimension of the newly-introduced reverse pass cost vector for pixel p.

Rather than assigning pixel p a disparity D*(p) via optimization of the forward pass cost directly, the disparity is D*(p) now assigned via optimization of the combined cost vector:

$$D^*(p) = \underset{d \in \mathcal{D}}{\operatorname{argmin}} \, E(p, d). \quad (13)$$

The addition of the reverse pass cost $R(p,d)$ mitigates the directional bias of the forward pass cost $L(p,d)$ when the optimization of the combined cost $E(p,d)$ is performed. Note, this final step can also be performed in-stream, as soon as the reverse pass cost components $R(p,d)$ have been computed for pixel p in the reverse pass stage, before cost vectors have been (partially or fully) assigned to later pixels. Hence, bias-corrected disparities can be assigned to earlier pixels of the target image before the processing of subsequent pixels has completed. This is in contrast to bias correction techniques that require disparity images to be fully computed and buffered before removing disparity pixels found to exhibit directional bias.

The FP stage 802 applies forward pass R3SGM, as described in section 3, to input and reference streams received thereat. That is, target and reference images received as respective pixel streams. The FP stage 802 outputs two streams of disparity cost vectors: a raw cost stream of raw disparity cost vectors, and an FP cost stream of FP cost vectors, smoothed as described above, and potentially exhibiting direction bias resulting from the order in which the pixels of the target and reference streams are received and processed.

The RP stage implements reverse pass R3SGM as described in further detail below. This is applied to the raw cost stream, and the result is an RP cost stream of RP cost vectors.

For each pixel, the FP and RP cost vectors are combined by summation as per Equation 12, by a combined cost vector computation component 806, to provide a combined cost stream of combined disparity cost vectors. The disparity assigned to the pixel, by the disparity estimation component 808, corresponds to the dimension of the lowest cost component of its combined disparity cost vector, as per Equation 13—a "winner takes all" (WTA) approach.

4.1 Reverse Pass Approximation

Considering Equation 9 above, in the forward pass SGM stage 802, it can be seen that, in the time step in which the forward pass cost vector for p is computed, all of the information needed for that calculation is available; by design: X is restricted to only "raster-friendly" directions such that the calculation only required the forward pass cost vectors of preceding pixels that have already been computed.

When it comes to the reverse pass stage 804, this is no longer the case: here, the aim is to allow subsequent pixels in the stream to influence the cost smoothing, in order to counter the directional bias of the first pass. This would mean smoothing based on directions $$X_R = \{\leftarrow, \nearrow, \uparrow, \nwarrow\}$$

for Full R3SGM and $$X_R = \{\nearrow, \uparrow, \nwarrow\}$$

for Fast R3SGM (as in the implementation described below).

Of course, when the pixels are streamed in raster order, the smoothed cost vectors for the subsequent pixels are not available; it is therefore not possible to simply substitute the reverse pass cost vectors for the forward pass cost vectors in Equation 9.

To address this issue in the reverse pass stage 804, in order to compute a reverse pass cost vector for given pixel, reverse pass cost vectors of the subsequent neighbouring pixels are approximated for the purpose of evaluating equation 9.

In the simplest case, the reverse pass cost vectors of the subsequent pixels are simply approximated as their raw cost vectors, i.e. $L(p-x, d')$ in the right-hand side of Equation 9 is approximated as $C_{p-x}(d')$.

This in itself is a relatively coarse approximation. In order to refine the forward pass cost estimates, the reverse pass stage 804 preferably operates in a number of "substages", $0, \ldots, N-1$. At the first substage (N=0), the reverse pass cost is estimated relatively coarsely as described in the previous paragraph, approximating the reverse past cost vectors of the neighbouring pixels as their raw costs. At each subsequent substage n>0, this is further refined: an updated estimate of the raw cost associated with pixel p is obtained using the reverse pass cost vectors of the neighbouring pixels from the previous stage. Using the notation $R^{n+1}(p,d)$ to denote the estimate of component d of the reverse pass cost vector for pixel p at substage n, then this can be expressed as follows:

At substage 0:
  approximate Equation 9 for each pixel p for the reverse pass directions $X_R$, substituting the raw costs $C_{p-x}(d'):=R^0(p, d')$ for the smoothed costs of each neighbouring pixel p-x;
  the output of substage 0 is an initial estimate $R^1(p,d)$ of the reverse pass costs for each pixel x, and this is the input to stage 1;

At each subsequent substage n>0:
refine the estimate for each pixel p for the reverse pass directions $X_R$, substituting the reverse pass cost estimates $R^n(p-x, d')$ from the previous substage n−1 for the smoothed costs of each neighbouring pixel p−x in Equation 9;
the output is a refined estimate $R^{n+1}(p,d)$ of the reverse pass costs for each pixel x—this is the input to the next stage n+1 for n<N−1 and is the final forward pass cost vector in the case of the final substance N−1.

Figure 9B:
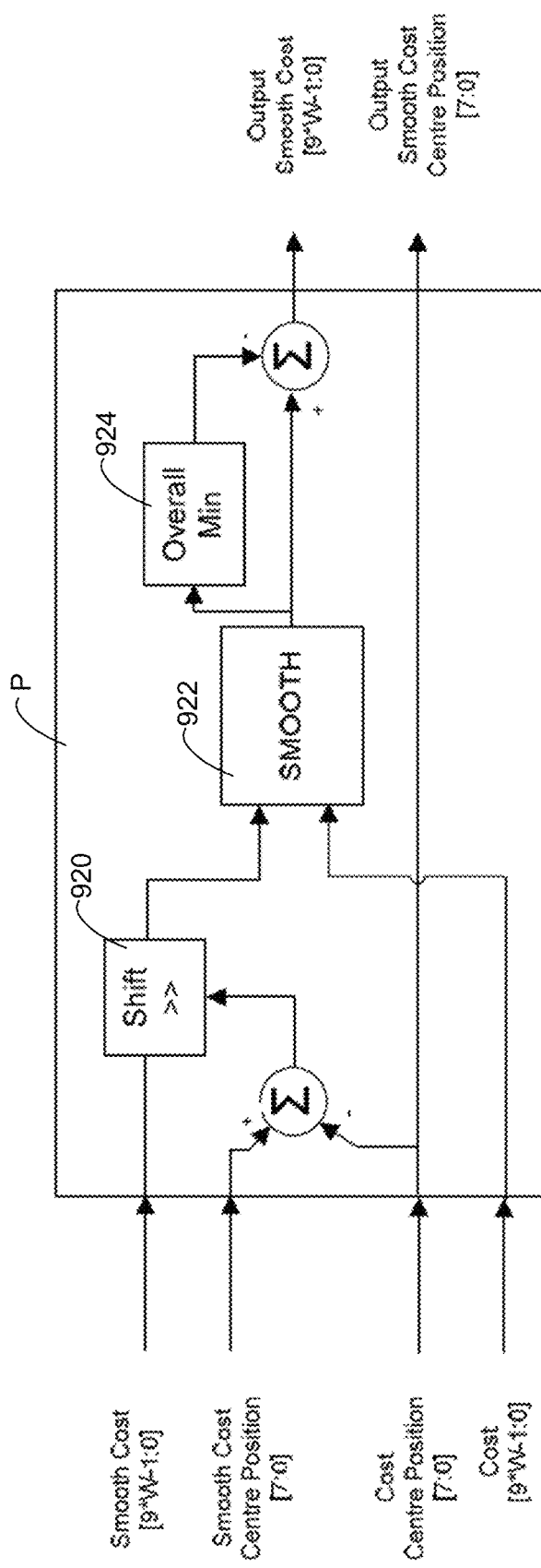
FIG. 9A shows an example hardware topology for the system of FIG. 8, with FIG. 9B showing details of each processing block within the hardware topology, and FIG. 9C demonstrating how the hardware topology is able to provide increasingly refined reverse pass disparity cost estimates.
Figure 9C:
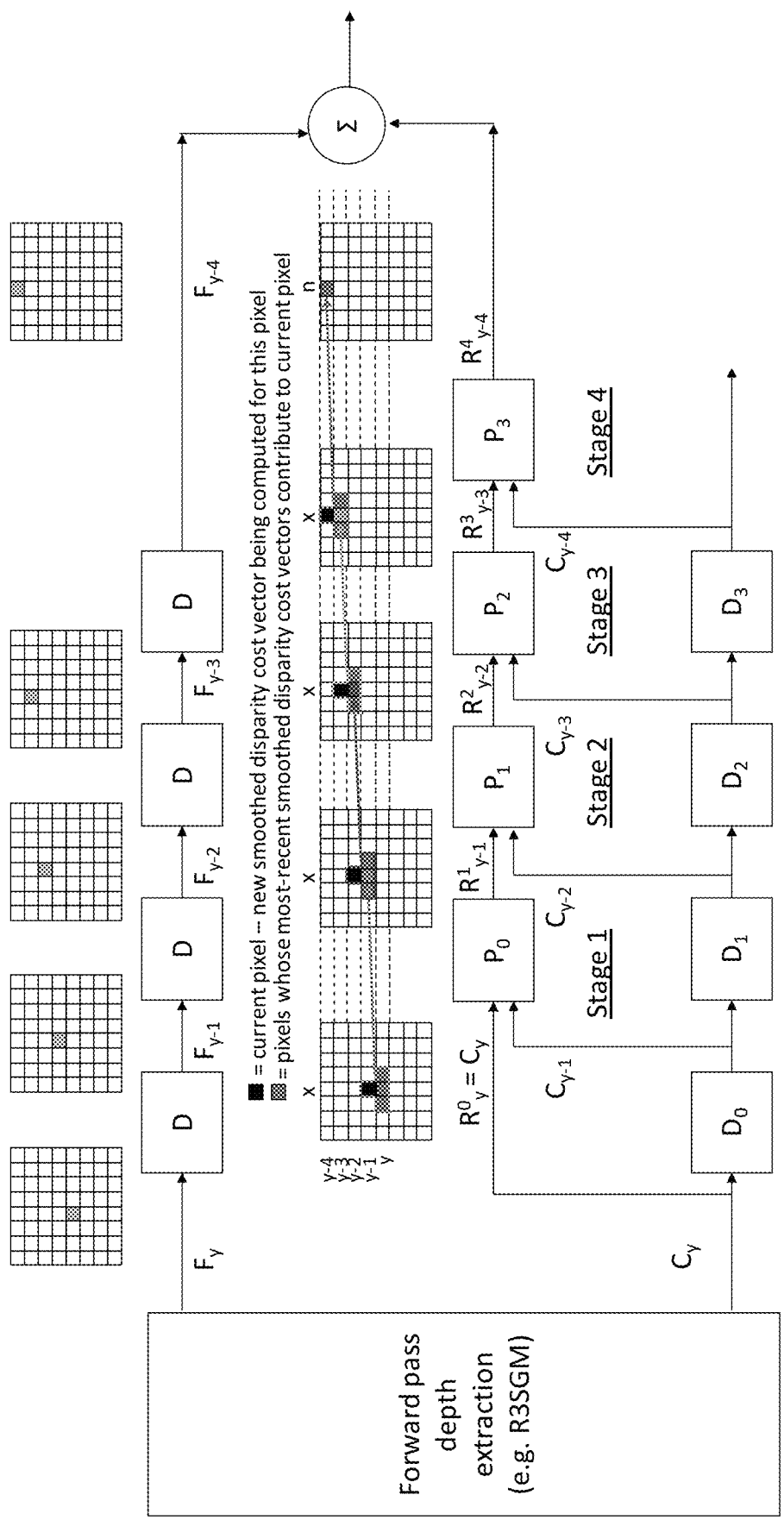

FIG. 9C shows an example topology for implementing the above with four substages 0, . . . , 3, each implemented as a processing block $P_n$ and corresponding delay block $D_n$.

At substage n=0, processing block $p_0$ receives a delayed version of the raw cost stream from delay block $D_0$, delayed by one pixel row, together with the original (undelayed) cost stream—cost smoothing is applied to the delayed stream (which is one row "behind" the undelayed cost stream in time), the undelayed cost stream provides the initial estimate of the forward pass cost vectors for the purpose of that smoothing.

The processing block $p_n$ of each subsequent substage receives the updated RP cost estimates from the previous processing block $p_{n-1}$, together with a further delayed version of the raw cost stream, delayed by another image row—this ensures that the raw cost stream received at each processing block (to which cost smoothing is always applied) remains one row behind the reverse pass cost estimates from the previous substage.

As can be seen, whereas the forward pass 802 depends on the forward pass cost vectors from all preceding pixels in the image, the reverse pass 804 only takes into account a limited "horizon" of N subsequent rows, where N is the total number of processing substages. The number of substages N can be chosen to provide any size of horizon in the reverse pass stage 804.

At each delay block D, the amount by which the input stream is delayed is sufficient to compensate for the fact that neighbouring pixels(s), whose contribution(s) are used to smooth a current pixel's cost, are subsequent to the current pixel within the streams. That is, by delaying the input stream, estimated forward pass costs from subsequent neighbouring pixels can be accounted for when applying cost smoothing to the delayed input stream at the corresponding processing block P.

Although a coarser approximation compared with the forward pass stage 802, the above approximation of the reverse pass stage 804 has been found to provide effective mitigation of the directional bias inherent in the forward pass stage 802, with the very significant benefit that all of the processing can be implemented in-stream, with cost vectors streamed contemporaneously with, and in the same order as the original target and reference image streams received at the forward pass stage 802.

4.2 Dimensionality Reduction

As an additional optimization, instead of applying the reverse pass stage to the full disparity vectors, a dimensionality reduction component 805 reduces their dimensionality for processing in the reverse pass stage 804, by retaining only a subset of dimensions in which the lowest cost component of the final combined disparity cost vector is expected. This means that different subsets of dimensions might be retained for different pixels.

Not only does this save memory, but it also reduces the size of processing blocks, look-up tables (LUTs), gates etc. in the computation of the smoothing functions. That is to say, dimensionality reduction reduces both the amount of memory and the amount of processing logic that needs to be implemented within the embedded system.

An "alignment value" is used to concisely indicate which dimensions have been retained, i.e. a disparity cost vector for a given pixel p $$C_p = (C_{p,0}, C_{p,1}, C_{p,2}, \ldots, C_{p,|\mathcal{D}|-1}),$$

where $C_{p,d} = C_p(d)$, becomes $$\tilde{C}_p = (\tilde{C}_{p,0}, \tilde{C}_{p,1}, \ldots, \tilde{C}_{p,W-1})$$

where an alignment value $a_p$ defines the mapping between the reduced cost vector $\tilde{C}_p$ and the full cost vector $C_p$, i.e. the correspondence between their respective dimensions. In the examples described below, the alignment value $a_p$ defines a simple dimensional offset between those vectors, such that:

$$\tilde{C}_{p,d} = C_{p,d+o(a_p)}, \quad (14)$$

i.e. dimension d in the reduced cost vector corresponds to dimension $d+o(a_p)$ in the full cost vector where the alignment value $a_p$ can be different for different pixels. The reduced vector $\tilde{C}_p$ contains only the components of $C_p$ within a window of size W defined by the alignment value $a_p$—the "reduced disparity space" for pixel p.

In the examples below, the alignment value $a_p$ defines a central dimension of the window, i.e. the window is centred on dimension $a_p$. In this case, $$o(a_p) = a_p - \frac{W-1}{2},$$

such that dimension d in the reduced vector corresponds to dimensions $$d + a_p - \frac{W-1}{2}$$

in the original, full vector. As will be appreciated, this is merely one possible definition of the alignment value, and it can be defined in other ways (e.g. the offset itself could be used as the alignment value etc.).

The central dimension for pixel p is, in this example, determined from that pixel's forward pass cost vector $$F_p = (F_{p,0}, F_{p,1}, F_{p,2}, \ldots, F_{p,|\mathcal{D}|-1}),$$

where $F_p = L(p,d)$, as $$a_p = \underset{d}{\mathrm{argmin}}\, F_p.$$

That is, as the dimension of the lowest cost component of the forward pass cost vector $F_p$. Here, the assumption is that the lowest cost component of the combined cost vector $E_p$ of Equation 12 will be within $$\pm \frac{W-1}{2}$$

of the lowest cost dimension $a_p$ of the forward pass cost vector.

If $a_p < (W-1)/2$, in effect, the window ranges from 0 to $(a_p + (W-1)/2)$ only; likewise, if $a_p > |\mathcal{D}| - (W-1)/2$, in effect, the window ranges from $a_p - (W-1)/2$ to $|\mathcal{D}|$ only. This can be implemented with a window of fixed size W by filling out-of-range disparity positions with the maximum cost value—which is exactly equivalent to having the reduced range.

The FP cost vector $F_p$ is reduced in exactly the same way, in the same reduced disparity space as the raw cost for each pixel, where $\tilde{R}_p$ denotes the reduced FP cost vector and $$\tilde{R}_{p,d} = R_{p,d+o(a_p)}. \tag{15}$$

The alignment value $a_p$ for each pixel is provided to the reverse pass stage 804 and remains associated with each pixel's raw cost vector $\tilde{C}_p$ as the reverse pass smoothing is performed. The RP cost vector and combined cost vector is also computed in reduced disparity space, and those reduced vectors are similarly denoted $\tilde{R}_p$ and $\tilde{E}_p$.

The RV and combined cost vectors are also computed in each pixel's reduced disparity space. Hence, the WTA optimization of the combined cost vector is applied to reduced vectors, and the dimensionality needs to be accounted for to obtain a disparity in the original disparity space $\mathcal{D}$ that is consistent across all pixels:

$$D^*(p) = \arg\min_{d \in D} \tilde{E}(p, d) + o(a_p).$$

where $\tilde{E}(p,d)$ denotes component d of the combined cost vector in the pixel's reduced disparity space.

Note, the "tilde" notation used above to distinguish between full and reduced vectors is omitted elsewhere in this disclosure for simplicity. Hence, elsewhere in this disclosure (including the appendant claims), the omission of a tilde from a vector does not necessarily imply that the vector is full in the above sense—in particular, the notation $R_p$ can refer to a full or reduced reverse pass cost vector elsewhere.

4.3 Embedded Implementation

FIG. 9A shows a hardware topology of an embedded implementation of the in-stream processing system of FIG. 8. FIG. 8 shows various blocks within the topology, each of which could, for example, be implemented as one or more physical hardware blocks of an FPGA or other embedded platform. The depicted blocks include delay blocks (labelled D) and processing blocks (labelled P). The depicted topology corrects the inherent bias in the smooth cost volume from a single raster pass.

The reverse pass stage 804 is shown to be formed of a series of delay blocks and a series of corresponding processing blocks—each made up of four blocks in this example, but there can be any number of blocks in each series (including a single block only).

References to time in the following refer to discrete time steps on which the system operates algorithmically, and simultaneously means received in the same time step. A time step could be a single clock cycle though, depending on image size and physical technology, the same arrangement could be implemented with either multiple clock cycles per pixel, or multiple pixels per clock cycle.

The system processes the raw cost volume and smooth cost volume from the forward-raster pass stage 805 in streaming fashion; a complete a single pixel is processed on each cycle, and thus an MD (Max-Disparity) wide vector of disparity values (e.g. 9-bit disparity values) is passed as input.

Two parameters define the accuracy and resources used in the processing:

N: Number of cost-volume horizontal rows below the raster point to trace through in the reverse-raster pass.

W: Width of reduced disparity vector, centred around the local minimum.

Each Delay block D represents a simple delay-line corresponding to precisely 1 entire row in the raster pass.

Each delay block has a first input for receiving a stream of cost vectors and a second input for receiving a stream of associated alignment values. The first delay block receives the stream of reduced raw disparity vectors from the dimensionality reduction component 805, and the alignment stream contains their respective alignment value. Each cost vector is received simultaneously with it associated alignment value, and this association is maintained throughout the reverse pass stage 804. Each delay block delays its received cost vector stream by a single pixel row, i.e. if a particular vector is received in time step n, that vector will be buffered in the delay block and outputted by the delay block at time step n+w where w is the number of pixels in one row of each image. Each delay block after the first delay block receives the delayed stream from the previous delay block—so the first delay block delays the raw cost stream by one row, the next delays it by another row (two rows in total), the next by another row (three rows in total). The alignment values are delayed by the same amount so that each raw cost vector retains its correspondence in time with its associated alignment value.

The processing chain consists of a series of N processing blocks P, used to propagate a reverse-direction smoothing function, each operating on a reduced disparity vector, centred on the overall minimum position calculated from the forward-raster pass. Each block marked "P" in FIG. 9A contains the operator depicted in FIG. 9B.

FIG. 9B shows each processing block P to comprise a shift block 920 that corrects for the difference in centre-positions between cost disparity vector and intermediate smoothed disparity vector at each stage, resulting from them being reduced vectors with potentially different alignment values. Values outside of the difference in disparity vector centre positions are marked as invalid (Maximum cost). Thus, if the centre position jumps from a local to a global minimum, the entire reverse-pass smoothed cost value is invalid.

A smooth function 922 is a computable (non-recursive) smoothing function operating on the stage's cost volume and partially smoothed cost volume, as an approximation to the forward raster's smoothing operation. It performs the following function across the W-wide disparity vectors at horizontal position x for $d = 0 : W - 1$ $OutputSmoothCost\,(x, d) = \text{Cost}\,(x, d) +$ $(\min(SmoothCost(x - 1, d - 1) + P1,$
$SmoothCost(x - 1, d),$
$SmoothCost(x - 1, d + 1) + P1)^*$
$3 +$
$\min(SmoothCost(x, d - 1) + P1,$
$(SmoothCost(x, d),$
$SmoothCost(x, d + 1) + P1)^*$
$2 +$
$\min(SmoothCost(x + 1, d - 1) + P1,$
$(SmoothCost(x + 1, d),$
$(SmoothCost(x + 1, d + 1) + P1)^*$ At each stage, the smooth function output is renormalized by subtracting (at block 924) the overall minimum of the smoothed cost vector at that stage, in order to prevent growth in the resulting smooth cost volumes.

The above pseudo code performs a weighted sum of the contributions from neighbouring pixels, with weights 3, 2 and 3 respectively. This is an approximation of Equation 9, and is chosen to simplify the arithmetic—division by $8=2^3$ is more straightforward to implement in an embedded architecture. The weights used for combining the neighbour contributions in the RP should match those used in the FP, so in this example, neighbour contributions in the FP would also be weighted by 3, 2, and 3 respectively.

Each processing block P has four inputs and two outputs: a cost input (C), a cost alignment input (Cost Centre Position, labelled CCP), an RP cost input (Smoothed Cost, labelled SC), and RP alignment input (Smoothed Cost Centre Position, SCCP). The CCP and SCCP terminology reflects the fact that, in this example, the alignment value $a_p$ is the central dimension (centre position) of the window. However, the description applies more generally with other definitions of alignment value.

Inputs C and CP receive respective cost vector streams—cost and SmoothCost respectively—and the smoothing block 922 applies cost smoothing to each cost vector of the stream received at input C based on the steam received at input SC. As can be seen from the pseudocode, this form of cost smoothing mirrors that applied in Fast R3SGM; each cost vector Cost (x,d) is smoothed based on smoothed cost vectors (the SmoothCost components) of neighbouring pixels x−1, x, x+1. Note, however, that the reverse-pass smoothing function does not include a (P2/Overall minimum) factor since an overall-minimum jump is incompatible with the reduced dimension disparity vector; as noted above, where there is a jump, the RP will always return a MAX_COST and so the resulting disparity will be the same as from the FP only.

Returning to FIG. 9A, it can be seen that the C input of each processing block P is coupled to an output of the corresponding delay block D. The first processing block P receives, at its SC input, the undelayed raw cost stream (after dimension reduction has been applied). Each subsequent processing block receives the reverse pass smoothed cost vector output of the previous processing block P in the series, i.e. the Output SmoothCost from the previous processing block.

Consequently, the stream at the C input of each processing block P (to which cost smoothing is applied) has been delayed by exactly one pixel row relative to the stream received at its SC input (on which the cost smoothing is based), i.e. cost (x) is delayed by exactly one pixel row relative to SmoothCost (x), meaning that cost (x) is smoothed based on estimated reverse pass smoothed costs of the three subsequent pixels immediately below it. These are estimated smoothed costs because final RP cost vectors have not yet been computed for these pixels.

FIG. 9C illustrates how this provides reverse pass cost smoothing over a limited "horizon" of pixel rows, where the number of rows defining the horizon is determined by the number of processing blocks.

The notation $R^n$ is used to denote the RP cost volume computed by processing block N, i.e. its OutputSmoothCost. The notation $R_{y-n}^n$ means row y−n of RP cost volume $R^n$. At processing block n, the raw cost of each pixel p, $C_p$, is smoothed based on $R^{n-1}$, and specifically based on the cost vectors in $R^{n-1}$ of the three pixels immediately below pixel p, in order to produce the output RP cost volume $R^n$. For each but the last processing block (N−1), $R^n$ is an intermediate RP cost volume uses as a basis for more refined cost smoothing in the next processing block.

For the first processing block (block 0), $R^n$=C, i.e. the RP smoothed cost volume is approximated at the raw cost volume.

Each processing block is delayed by one row relative to the previous block. FIG. 9C shows a particular time step, illustrating this effect—the shaded pixel in the final RP cost volume $R^N$ (N=4 in this example) can be seen to have been influenced by the N rows below it, where N is the total number of processing blocks and delay blocks.

3.4 Efficient Computation of Neighbour Contributions

Equation 11 above reflects an implementation "trick" for the forward pass of R3SGM, that recognizes that it is only necessary to compute the neighbour contribution for one direction in a given time step.

The following assumes an implementation in which one time step equates to one pixel.

FIG. 14 illustrates how this is applied in the forward pass stage 802. In any given time step, only one neighbour contribution needs to be computed—by way of example, the contribution for pixel 1420 is shown to be computed at time step t; this is the contribution in the "↙" direction for pixel 1402, but also the contribution for pixel 1404 in the "↓" direction and the contribution for pixel 1406 in the "↘" direction.

For pixel 1402, the "↓" and "↘" contributions are those computed in the two time steps immediately preceding t, and the same principles apply for pixels 1404 and 1406 (with the contribution from pixel 1420 being the contribution computed one and two time steps ago, at t+1 and t+2 respectively).

The contribution of a given pixel p−x means the term $$\min_{d' \in \mathcal{D}} (L(p - x, d'))$$

in Equation 9, where pixel 1420 would be pixel p−x and pixel x would be pixel 1420 for x=↘, pixel 1404 for x=↓ and pixel 1406 for x=↙.

The combined sum of the three neighbour contributions is just a "moving average in time" over three pixels (time steps) of the single direction calculation. Although not shown explicitly in Equation 9, this can be a weighted moving average where the contribution from different pixels is weighted slightly different (e.g. in the example below, different weights are used to simplify the arithmetic that is performed in each time step).

Similar principles may be applied for the memory-efficient reverse pass stage 804 described above, with the delayed cost stream and the previous reverse pass cost estimates. At each substage n, the contribution of a given pixel p−x in the reverse pass stage 804 is based on the estimate of its RP costs from the previous stage (or the raw costs for the first substage):

$$\min_{d'} R^n(p - x, d').$$

In the pseudocode above, this corresponds to the "SmoothCost" term for the pixel in question (x−1, x or x+1—computed across three time steps in total). This only needs to be computed once at each substage for each pixel (i.e. one contribution per pixel per processing block).

However, some extra logic is needed to account for the possible misalignment between different reduced cost vectors (the centre position of the reduced disparity vector being processed at each pixel is potentially different).

Although not depicted in FIG. 9B, the smoothing function 922 of each processing block P has three shift operations—one for each neighbour contribution according to the centre position at that neighbour, required to align it with the current stage's output centre position at that pixel. This still only needs one neighbour contribution calculation in each of the 0, . . . , N−1 substages—with delayed values of one and two cycles being used, just with different centre-position alignment shifts before the summation.

5. Experiments

The performance of a simulated implementation of the in-stream processing system 800 has been evaluated by processing a series of captured frame pairs using a full combined forward and reverse-raster pair, and comparing to the results calculated in a single forwards pass with the apparatus as described above. The results are summarized in FIGS. 10 through 12. For each point in the resulting disparity map that has a corresponding point in the reference disparity map, the disparity difference is calculated and accumulated to produce a distribution of disparity errors. 10 captured reference frames were used for the simulation, each of 2448×1130 resolution.

In this context, error is measured relative to a full "dual pass" of the kind implemented in the Hybrid Architecture outlined above, in which contributions from all directions are accounted for without the reverse pass approximations set out above (and without the benefit of full in-stream processing). FIG. 10 shows results for different values of N (i.e. different numbers of reverse pass substages), and FIG. 11 shows results for different window sizes W. The relatively narrow error distributions demonstrate an effective tradeoff, where in-stream processing is achieved with an acceptable error penalty.

6. Example Application

An example application of Unbiased R$^3$SGM is in autonomous vehicles and other robotic systems.

Autonomous decision making is a critical function of an autonomous vehicle. This is true whatever its level of autonomy, but as the level of autonomy increases, so too does the complexity of the decisions it needs to be able to make safely, to the point where a fully autonomous vehicle needs to be equipped with an exceptionally robust decision making engine that can be relied upon to safely handle any driving scenario it encounters, however unexpected. To be able to do so, it is important that the processing of the sensor signals that feeds into the decision making is not only sufficiently accurate, but also fast and robust enough to be able to make decisions sufficiently quickly and reliably.

In the following, components corresponding to those of FIG. 1 are denoted by the same reference numerals.

Figure 13:
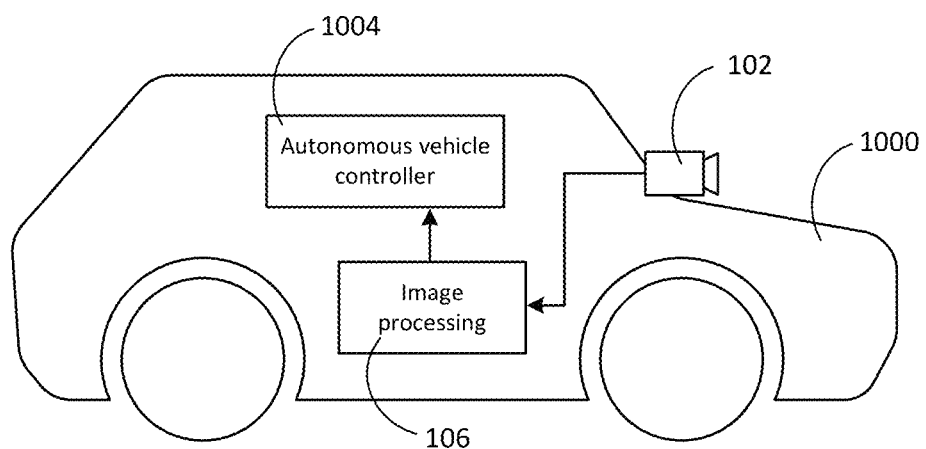
FIG. 13 shows a highly schematic block diagram of an autonomous vehicle.

FIG. 13 shows a highly-schematic block diagram of an autonomous vehicle 1000, which is shown to comprise an image processing system 106, having an input connected to at least one stereo image capture system 102 of the vehicle's sensor system and an output connected to an autonomous vehicle control system (controller) 1004. In use, the image processing system 106 of the autonomous vehicle 100 processes images captured by the image capture system 102, in real time, and the autonomous vehicle controller 1004 controls the speed and direction of the vehicle based on the results, with no or limited input from any human. The vehicle 1000 is a car in this example, but it can be any form of vehicle. The image capture system 102 is a stereoscopic image capture system, comprising a pair of stereoscopic image capture units (c.f. 102L and 102R in FIG. 1) for capturing stereoscopic image pairs. Various image processing functions can be performed by the image processing system 106, such as visual structure detection and spatial depth extraction.

Unbiased R$^3$SGM may be implemented within the image processing system 106, in order to provide fast and robust spatial depth detection within the autonomous vehicle 100. In this context, the depth information extracted from stereoscopic image pairs captured by the image capture device 102 is used by the control system 1004 as a basis for autonomous decision making, in conjunction with other image processing such as visual structure detection (e.g. detection of roads, objects etc.).

Although only one image capture system 102 is shown in FIG. 13, the autonomous vehicle could comprise multiple such devices, e.g. forward-facing and rear-facing stereo image capture systems.

The control system 1004 can control various subsystems of the vehicle based on the decisions it makes, including the engine and wheels via a suitable drive mechanism.

REFERENCES

[10] S. K. Gehrig, F. Eberli, and T. Meyer. A Real-Time Low-Power Stereo Vision Engine Using Semi-Global Matching. In ICVS, pages 134-143, 2009.

[15] D. Hernandez-Juarez, A. Chacon, A. Espinosa, D. Vazquez, J. C. Moure, and A. M. Lopez. Embedded real-time stereo estimation via Semi-Global Matching on the GPU. *Procedia Computer Science*, 80:143-153, 2016.

[24] A. Kuzmin, D. Mikushin, and V. Lempitsky. End-to-end Learning of Cost-Volume Aggregation for Real-time Dense Stereo. In MLSP, pages 1-6, 2017.

[29] M. Menze and A. Geiger. Object Scene Flow for Autonomous Vehicles. In CVPR, pages 3061-3070, 2015.

[30] M. Menze, C. Heipke, and A. Geiger. Joint 3D Estimation of Vehicles and Scene Flow. *ISPRS Annals of the Photogrammetry, Remote Sensing and Spatial Information Sciences*, 2:427, 2015

[34] S. Perri, F. Frustaci, F. Spagnolo, and P. Corsonello. vision architecture for heterogeneous systems-on-chip. *Journal of Real-Time Image Processing*, pages 1-23, 2018.

[39] D. Scharstein and R. Szeliski. A Taxonomy and Evaluation of Dense Two-Frame Stereo Correspondence Algorithms. IJCV, 47(1-3):7-42, 2002.

[40] Scharstein and R. Szeliski. High-Accuracy Stereo Depth Maps Using Structured Light. In CVPR, 2003. 6,7,8

[42] Y. Shan, Y. Hao, W. Wang, Y. Wang, X. Chen, H. Yang, and W. Luk. Hardware Acceleration for an Accurate Stereo Vision System Using Mini-Census Adaptive Support Region. ACM Transactions on Embedded Computing Systems (TECS), 13(4s), 2014. 2,7, 8

[46] C. Ttofis and T. Theocharides. Towards Accurate Hardware Stereo Correspondence: A Real-Time FPGA Implementation of a Segmentation-Based Adaptive Support Weight Algorithm. In Design, Automation & Test in Europe Conference & Exhibition (DATE), 2012, pages 703-708, 2012

[50] L. Zhang, K. Zhang, T. S. Chang, G. Lafruit, G. K. Kuzmanov, and D. Verkest. Real-Time High-Definition Stereo Matching on FPGA. *Proceedings of the 19th*

*ACM/SIGDA International Symposium on Field Programmable Gate Arrays*, pages 55-64, 2011.

The invention claimed is:

1. An in-stream disparity processing system comprising:
   a delay block having an input for receiving an input stream of disparity cost vectors, and configured to provide a delayed stream of disparity cost vectors at an output of the delay block, by delaying the input stream by a predetermined amount; and
   a processing block having a cost input connected to receive the delayed stream of disparity cost vectors and a smoothing input connected to receive the input stream of disparity cost vectors, and configured to apply cost smoothing to the delayed stream based on the input stream, so as to generate, at an output of the processing block, a stream of reverse pass disparity cost vectors.

2. The in-stream disparity processing system of claim 1, wherein each disparity cost vector of the input stream has an associated alignment value, that remains associated with it in the delayed stream, wherein the processing block is configured to account for any offset between each disparity cost vector of the input stream and one or more disparity cost vectors of the delayed stream used to smooth it, using the alignment values associated with those pixels.

3. The in-stream disparity processing system of claim 2, comprising a reduction component configured to reduce the dimensions of each disparity cost vector of the input stream, before it is provided to the delay block and the processing block, the alignment value indicating which of the dimensions has been retained.

4. The in-stream disparity processing system of claim 1, wherein:
   the delay block is the first in a series of delay blocks, each other delay block having an output and an input connected to the output of the previous delay block, and being configured to provide at its output a delayed stream of disparity cost vectors by further delaying, by a predetermined amount, the delayed stream of disparity cost vectors received from the previous delay block; and
   the processing block is the first in a series of processing blocks, each other processing block having an output, a cost input connected to the output of a corresponding one of the delay blocks and a smoothing input connected to the output of the previous processing block, and being configured to generate, at its output, a stream of reverse pass disparity cost vectors, by applying cost smoothing to the delayed stream received from the corresponding delay block, based on the stream of reverse pass disparity cost vectors generated at the output of the previous processing block.

5. The in-stream disparity processing system of claim 4, wherein each disparity cost vector of the input stream has an associated alignment value, that remains associated with it in the delayed stream, wherein the processing block is configured to account for any offset between each disparity cost vector of the input stream and one or more disparity cost vectors of the delayed stream used to smooth it, using the alignment values associated with those pixel;
   wherein each processing block is configured to output, with each of its reverse pass disparity cost vectors, the alignment value of the corresponding disparity cost vector of the delayed stream received at its cost input, each other processing block configured to use the alignment values received from the previous processing block to account for any offsets with the delayed stream received from its corresponding delay block.

6. The in-stream disparity processing system of claim 4, comprising an input configured to receive a stream of forward pass disparity cost vectors and a cost aggregation component configured to combine each reverse pass disparity cost outputted by a final processing block of the series of processing blocks with a corresponding one of the forward pass disparity cost vectors.

7. The in-stream disparity processing system of claim 1, comprising an input configured to receive a stream of forward pass disparity cost vectors and a cost aggregation component configured to combine each reverse pass disparity cost outputted by the processing block with a corresponding one of the forward pass disparity cost vectors.

8. The in-stream disparity processing system of claim 7, comprising a disparity estimation component configured to determine a pixel disparity for each combined disparity cost vector based on a lowest cost dimension of the combined disparity cost vector.

9. The in-stream disparity processing system of claim 7, comprising a reduction component configured to reduce the dimensions of each disparity cost vector of the input stream, before it is provided to the delay block and the processing block, the alignment value indicating which of the dimensions has been retained;
   wherein the reduction component is configured to:
   determine a lowest cost dimension of each forward pass disparity cost vector, and
   reduce the dimensions of each disparity cost vector based on the lowest cost dimension of a corresponding one of the forward pass disparity cost vectors, that lowest cost dimension being the alignment value of that disparity cost vector.

10. The in-stream disparity processing system of claim 9, wherein the pixel disparity is determined as the sum of the minimum cost dimension of the combined disparity cost vector with the alignment value.

11. The in-stream disparity processing system of claim 1, comprising an image processing component configured to receive a target image stream and a reference image stream, and use the reference image stream to compute, for each pixel of the target image stream, a disparity cost vector of the input stream.

12. The in-stream disparity processing system of claim 11, wherein:
   the delay block is the first in a series of delay blocks, each other delay block having an output and an input connected to the output of the previous delay block, and being configured to provide at its output a delayed stream of disparity cost vectors by further delaying, by a predetermined amount, the delayed stream of disparity cost vectors received from the previous delay block; and
   the processing block is the first in a series of processing blocks, each other processing block having an output, a cost input connected to the output of a corresponding one of the delay blocks and a smoothing input connected to the output of the previous processing block, and being configured to generate, at its output, a stream of reverse pass disparity cost vectors, by applying cost smoothing to the delayed stream received from the corresponding delay block, based on the stream of reverse pass disparity cost vectors generated at the output of the previous processing block;
   the in-stream disparity processing system comprising an input configured to receive a stream of forward pass disparity cost vectors and a cost aggregation component configured to combine each reverse pass disparity cost outputted by a final processing block of the series of processing blocks with a corresponding one of the forward pass disparity cost vectors;

wherein the image processing component is configured to compute, for each pixel of the target image stream, one of the forward pass disparity cost vectors, based on:
(i) the disparity cost vector of that pixel, and
(ii) the forward pass disparity cost vector of at least one preceding pixel in the target image stream but not any subsequent pixel of the target image stream, such that the forward pass disparity cost vectors exhibit directional bias caused by the order in which pixels of the target image stream are received and processed, the reverse pass disparity cost vectors for compensating for said directional bias.

13. The in-stream disparity processing system of claim 12, wherein each delay block is configured to delay its received stream by one pixel row.

14. The in-stream disparity processing system of claim 1, wherein the processing block computes a smoothing contribution for each disparity cost vector received at its smoothing input, which is stored at that processing block and used to apply cost smoothing to multiple disparity cost vectors received at its cost input.

15. The in-stream disparity processing system according to claim 14, wherein each disparity cost vector of the input stream has an associated alignment value, that remains associated with it in the delayed stream, wherein the processing block is configured to account for any offset between each disparity cost vector of the input stream and one or more disparity cost vectors of the delayed stream used to smooth it, using the alignment values associated with those pixels;

the in-stream disparity processing system comprising a reduction component configured to reduce the dimensions of each disparity cost vector of the input stream, before it is provided to the delay block and the processing block, the alignment value indicating which of the dimensions has been retained;

wherein the alignment value of the disparity cost vector received at the smoothing input remains associated with its smoothing contribution for applying the cost smoothing to the multiple disparity cost vectors received at its cost input.

16. A method of smoothing an input stream of disparity cost vectors, the method comprising, in an in-stream processing system:

receiving at a processing block of the in-steam processing system (i) an input stream of disparity cost vectors, and (ii) a version of the input stream delayed by a predetermined amount, the disparity cost vectors associated with respective pixels of a target image stream, having been determined by applying stereo image processing to the target image stream and a reference image stream; and for each of the pixels, applying cost smoothing to that pixel's disparity cost vector, as received in the delayed stream, based on the disparity cost vector(s) of one or more neighbouring pixels, as received in the input stream, the neighbouring pixels being subsequent to that pixel in the target image stream, which is accounted for by said delaying of the input stream.

17. The method of claim 16, comprising:

receiving at a second processing block of the in-stream processing system (i) a first reverse pass cost stream, from the first processing block, and (ii) a second delayed version of the input stream obtained by further delaying the input stream, wherein the first reverse pass cost stream contains, for each of said pixels, a first reverse pass cost vector as computed at the first processing block from said cost smoothing; and for each of the pixels, applying second cost smoothing to that pixel's disparity cost vector, as received in the second delayed stream, based on the first reverse pass cost vector(s) of one or more neighbouring pixels, as received in the first reverse pass cost stream, thereby computing a second reverse pass cost vector for that pixel, the second reverse pass cost vectors outputted from the second processing block as a second reverse pass cost stream.

18. The method of claim 17, wherein said processing block n=0 is a first processing block in a processing chain with one or more subsequent processing blocks n>0 and the method comprises, at each subsequent processing block n>0:

receiving an nth delayed version of the input stream, and computing, for each of said pixels p, a reverse pass cost vector $R_p^{n+1}$, by applying cost smoothing to that pixel's disparity cost vector $C_p$ in the nth delayed input stream, based on $R_{p-x}^n$ for at least one subsequent neighbouring pixel p−x, where $R_{p-x}^n$ is the reverse pass cost vector assigned to the neighbouring pixel p−x in the previous processing block n−1.

19. The method of claim 16, comprising the step of assigning a disparity value to each of the pixels based on one of: that pixel's reverse pass cost vector, that pixel's second reverse pass cost vector, or that pixel's $R_p^N$ reverse pass cost vector where processing block N−1 is the final processing block in the processing chain.

20. A non-transitory computer-readable storage medium having stored thereon register-transfer level code or other circuit description code operable to configure a field programmable gate array to implement:

a delay block having an input for receiving an input stream of disparity cost vectors, and configured to provide a delayed stream of disparity cost vectors at an output of the delay block, by delaying the input stream by a predetermined amount; and a processing block having a cost input connected to receive the delayed stream of disparity cost vectors and a smoothing input connected to receive the input stream of disparity cost vectors, and configured to apply cost smoothing to the delayed stream based on the input stream, so as to generate, at an output of the processing block, a stream of reverse pass disparity cost vectors.

* * * * *